US012501420B2

United States Patent
Zhang et al.

(10) Patent No.: US 12,501,420 B2
(45) Date of Patent: Dec. 16, 2025

(54) SIGNALING TO OVERRIDE RADIO RESOURCE CONTROL (RRC) CONFIGURED DIRECTION

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 17/935,072

(22) Filed: Sep. 23, 2022

(65) Prior Publication Data
US 2024/0107517 A1  Mar. 28, 2024

(51) Int. Cl.
*H04W 72/1263* (2023.01)
*H04L 5/14* (2006.01)
(Continued)

(52) U.S. Cl.
CPC ....... *H04W 72/1263* (2013.01); *H04L 5/1469* (2013.01); *H04W 72/23* (2023.01); *H04W 76/20* (2018.02); *H04W 80/02* (2013.01)

(58) Field of Classification Search
CPC ......... H04L 5/003; H04L 5/0094; H04L 5/14; H04L 5/1469; H04W 72/0446;
(Continued)

(56) References Cited

U.S. PATENT DOCUMENTS 8,924,558 B2  12/2014  Gross
10,805,942 B1  10/2020  Li
(Continued)

FOREIGN PATENT DOCUMENTS

EP  4002940 A1 *  5/2022  .......... H04J 11/0073
EP  4307802 A1 *  1/2024  .............. H04L 1/08
(Continued)

OTHER PUBLICATIONS

Dell Technologies, Discussion on NR Sub-Band Full Duplex, Aug. 22, 2022, 3GPP TSG RAN WG1 Meeting #110, Toulouse, France, Agenda Item: 9.3.2, Tdoc: R1-2205812 (Year: 2022).*
(Continued)

*Primary Examiner* — Eric Nowlin
(74) *Attorney, Agent, or Firm* — Procopio, Cory, Hargreaves & Savitch LLP

(57) ABSTRACT

A UE receives a first Time Division-Duplexing (TDD) Uplink (UL) Downlink (DL) slot format configuration in RRC signaling, the first TDD UL DL slot format configuration indicating types of communication for a set of symbols or a set of slots, the types of the communication including one or more of uplink, downlink, or flexible. The UE further receives an indication of an adjusted type for at least one symbol in the set of symbols or at least one slot in the set of slots. The at least one symbol for which a type of the communication is adjusted is a downlink symbol or an uplink symbol based on the first time TDD UL DL slot format configuration, or the at least one slot for which the type of the communication is adjusted is a downlink slot or an uplink slot based on the first time TDD UL DL slot format configuration.

28 Claims, 13 Drawing Sheets

(51) Int. Cl.
*H04W 72/23* (2023.01)
*H04W 76/20* (2018.01)
*H04W 80/02* (2009.01)

(58) Field of Classification Search
CPC ............ H04W 72/1263; H04W 72/23; H04W 72/232; H04W 76/20; H04W 80/02
See application file for complete search history.

(56) References Cited

U.S. PATENT DOCUMENTS

| | | | | |
|---|---|---|---|---|
| 11,147,051 | B2* | 10/2021 | Kwak | H04L 25/0238 |
| 11,239,974 | B2* | 2/2022 | Li | H04L 1/1607 |
| 11,533,723 | B2* | 12/2022 | Ko | H04J 11/0076 |
| 11,638,253 | B2* | 4/2023 | Ko | H04L 5/14 370/280 |
| 11,778,631 | B2* | 10/2023 | Kwak | H04L 5/0048 370/329 |
| 11,991,122 | B2* | 5/2024 | Zhang | H04L 5/14 |
| 12,166,609 | B2* | 12/2024 | Li | H04L 5/0053 |
| 12,284,046 | B2* | 4/2025 | Agrawal | H04L 1/203 |
| 2019/0149269 | A1* | 5/2019 | Chatterjee | H04L 5/0094 370/329 |
| 2019/0174487 | A1* | 6/2019 | Sun | H04L 5/0005 |
| 2019/0222380 | A1* | 7/2019 | Manolakos | H04L 25/0224 |
| 2019/0349904 | A1* | 11/2019 | Kwak | H04L 69/324 |
| 2020/0137793 | A1* | 4/2020 | Chen | H04W 28/26 |
| 2020/0275418 | A1* | 8/2020 | Wong | H04L 5/0007 |
| 2021/0014858 | A1* | 1/2021 | Fakoorian | H04L 5/0053 |
| 2021/0068086 | A1* | 3/2021 | Behravan | H04L 5/0053 |
| 2021/0168807 | A1 | 6/2021 | Jung et al. | |
| 2021/0218494 | A1* | 7/2021 | Liu | H04B 7/15542 |
| 2021/0219187 | A1* | 7/2021 | Lee | H04W 4/40 |
| 2021/0337539 | A1* | 10/2021 | Lei | H04W 72/23 |
| 2022/0022175 | A1* | 1/2022 | Kwak | H04L 25/0238 |
| 2022/0131725 | A1* | 4/2022 | Li | H04L 5/0048 |
| 2022/0174672 | A1* | 6/2022 | Ko | H04J 11/0076 |
| 2022/0256601 | A1* | 8/2022 | Harada | H04W 72/0446 |
| 2022/0295560 | A1* | 9/2022 | Shokri Razaghi | H04W 72/23 |
| 2022/0407668 | A1* | 12/2022 | Zhang | H04W 72/23 |
| 2023/0042690 | A1* | 2/2023 | Ko | H04W 72/0446 |
| 2023/0199732 | A1* | 6/2023 | Ko | H04W 56/0015 370/280 |
| 2023/0327825 | A1* | 10/2023 | Agrawal | H04W 72/0446 370/329 |
| 2023/0421318 | A1* | 12/2023 | Li | H04L 5/001 |
| 2023/0421341 | A1* | 12/2023 | Ibrahim | H04W 72/0446 |
| 2024/0107517 | A1* | 3/2024 | Zhang | H04W 72/23 |
| 2024/0224246 | A1* | 7/2024 | Zhang | H04L 5/0094 |
| 2024/0357668 | A1* | 10/2024 | Wu | H04W 74/0833 |
| 2024/0422763 | A1* | 12/2024 | Lei | H04W 72/12 |
| 2025/0016744 | A1* | 1/2025 | Zhang | H04L 5/14 |
| 2025/0016753 | A1* | 1/2025 | Ma | H04L 5/14 |
| 2025/0048337 | A1* | 2/2025 | Guo | H04W 72/0453 |

FOREIGN PATENT DOCUMENTS

| | | | | |
|---|---|---|---|---|
| EP | 4002940 B1 * | 3/2025 | | H04W 48/10 |
| WO | 2021257201 A1 | 12/2021 | | |
| WO | WO-2022188737 A1 * | 9/2022 | | H04L 1/08 |

OTHER PUBLICATIONS

Interdigital, Inc., Discussion on SBFD operations for NR-duplex, Aug. 22, 2022, 3GPP TSG RAN WG1 Meeting #110, Toulouse, France, Agenda Item: 9.3.2, Tdoc: R1-2205937 (Year: 2022).*
International Search Report and Written Opinion—PCT/US2023/029038—ISA/EPO—Nov. 20, 2023.
ZTE: "Discussion of subband non-overlapping full duplex", 3GPP TSG RAN WG1 #110, R1-2205960, 3rd Generation Partnership Project, Mobile Competence Centre, 650, Route Des Lucioles, F-06921 Sophia-Antipolis Cedex, France , vol. RAN WG1, No. Toulouse, France, Aug. 22, 2022-Aug. 26, 2022, Aug. 12, 2022, 15 Pages, XP052273893, pp. 2,3,8.

* cited by examiner

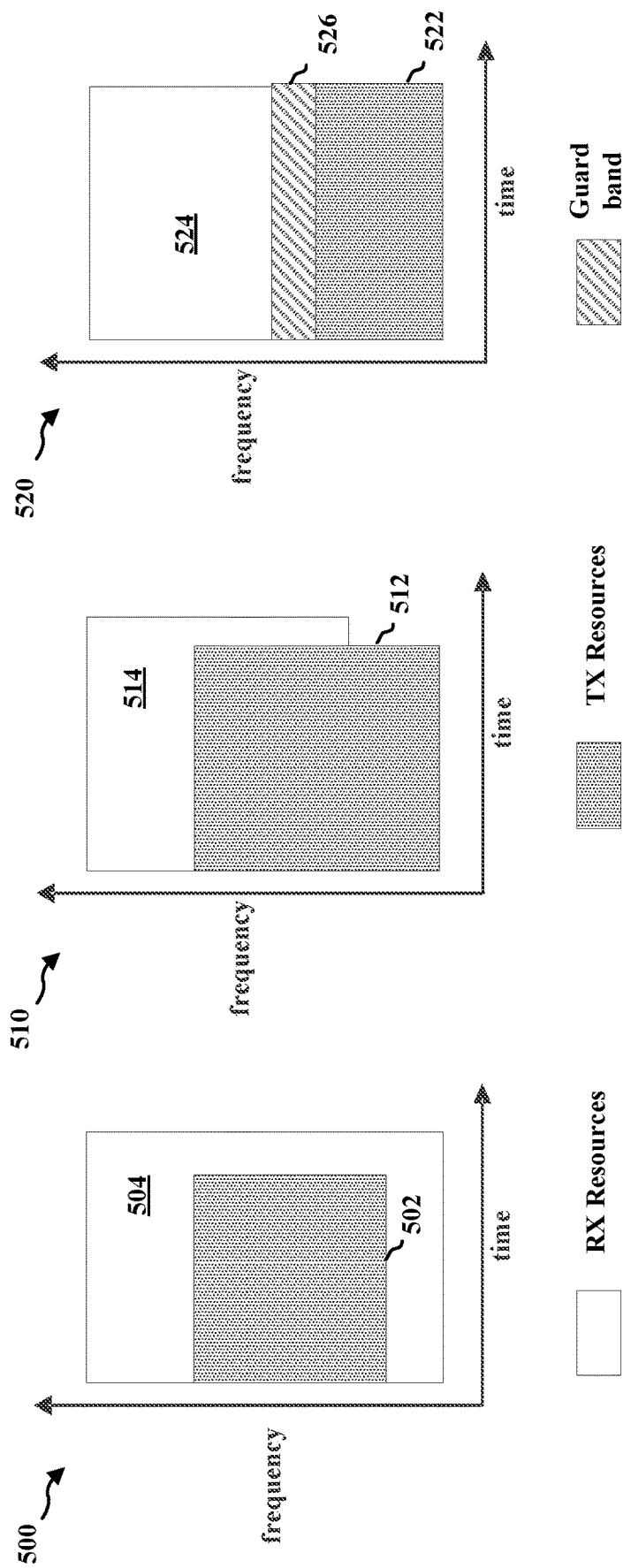
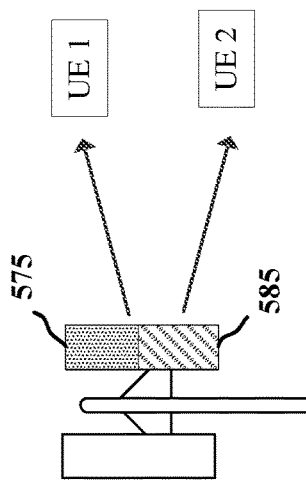
FIG. 5A
FIG. 5B

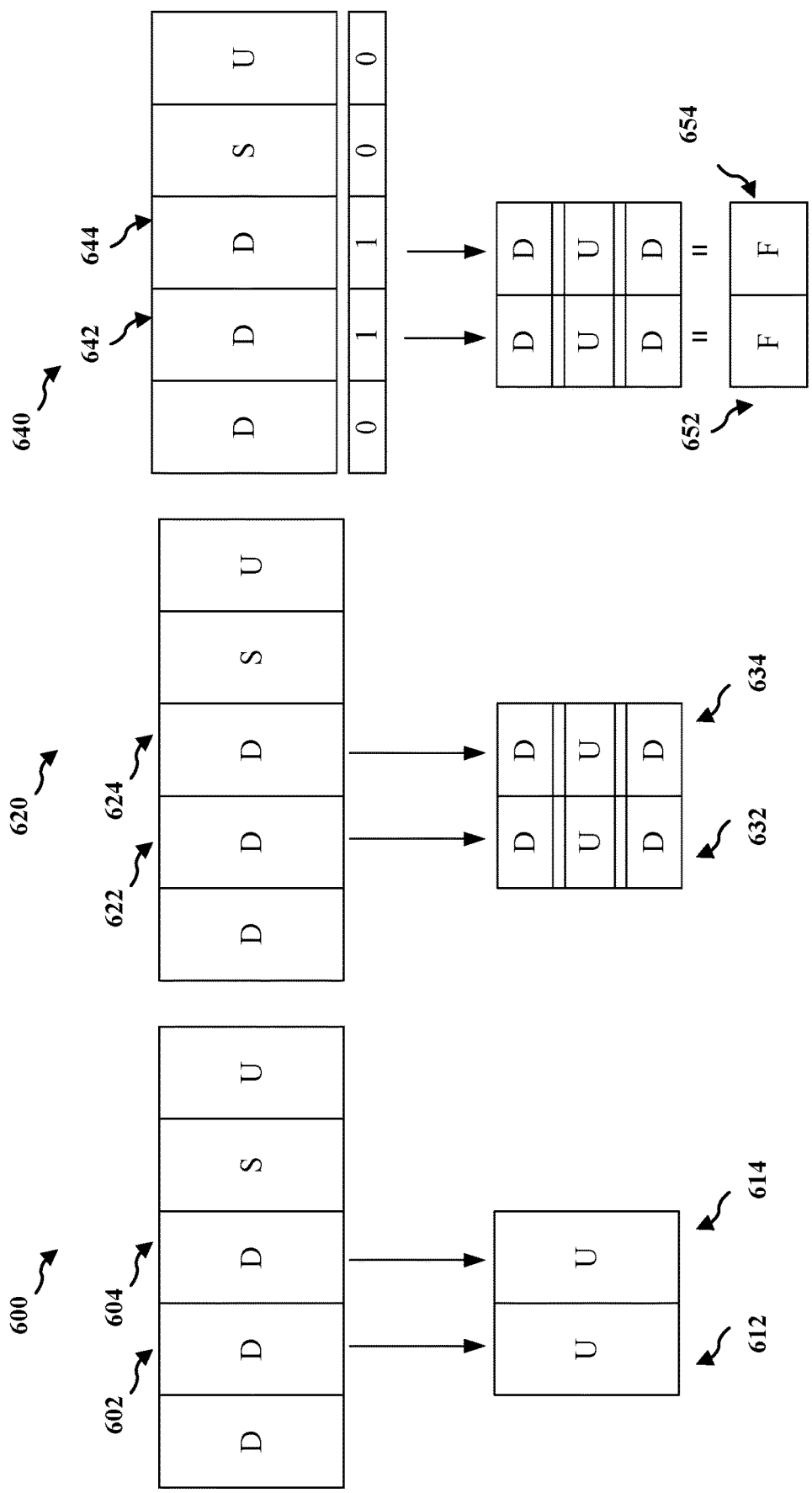

SIGNALING TO OVERRIDE RADIO RESOURCE CONTROL (RRC) CONFIGURED DIRECTION

TECHNICAL FIELD

The present disclosure relates generally to communication systems, and more particularly, to wireless communication including signaling to override radio resource control (RRC) configured direction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global levels. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory; and at least one processor coupled to the memory and configured to: receive a first time division duplex (TDD) uplink (UL) downlink (DL) slot format configuration in radio resource control (RRC) signaling, the first TDD UL DL slot format configuration indicating types of communication for a set of symbols or a set of slots, the types of the communication including one or more of uplink, downlink, or flexible; and receive an indication of an adjusted type for at least one symbol in the set of symbols or at least one slot in the set of slots, wherein the at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration.

In an aspect of the disclosure, a method, a computer-readable medium, and an apparatus are provided for wireless communication at a network entity. The apparatus may include memory; and at least one processor coupled to the memory and configured to: transmit a first TDD UL DL slot format configuration in RRC signaling, the first TDD UL DL slot format configuration indicating types of communication for a set of symbols or a set of slots, the types of the communication including one or more of uplink, downlink, or flexible; and transmit an indication of an adjusted type for at least one symbol in the set of symbols or at least one slot in the set of slots, wherein the at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5A illustrates examples of in-band full-duplex (IBFD) resources and sub-band full-duplex (SBFD) resources.

FIG. 5B illustrates an example of a device using portions of an antenna panel for full duplex communication.

FIGS. 6A, 6B, and 6C are diagrams illustrating overriding RRC configuration direction in accordance with various aspects of the present disclosure.

DETAILED DESCRIPTION

Figure 1:
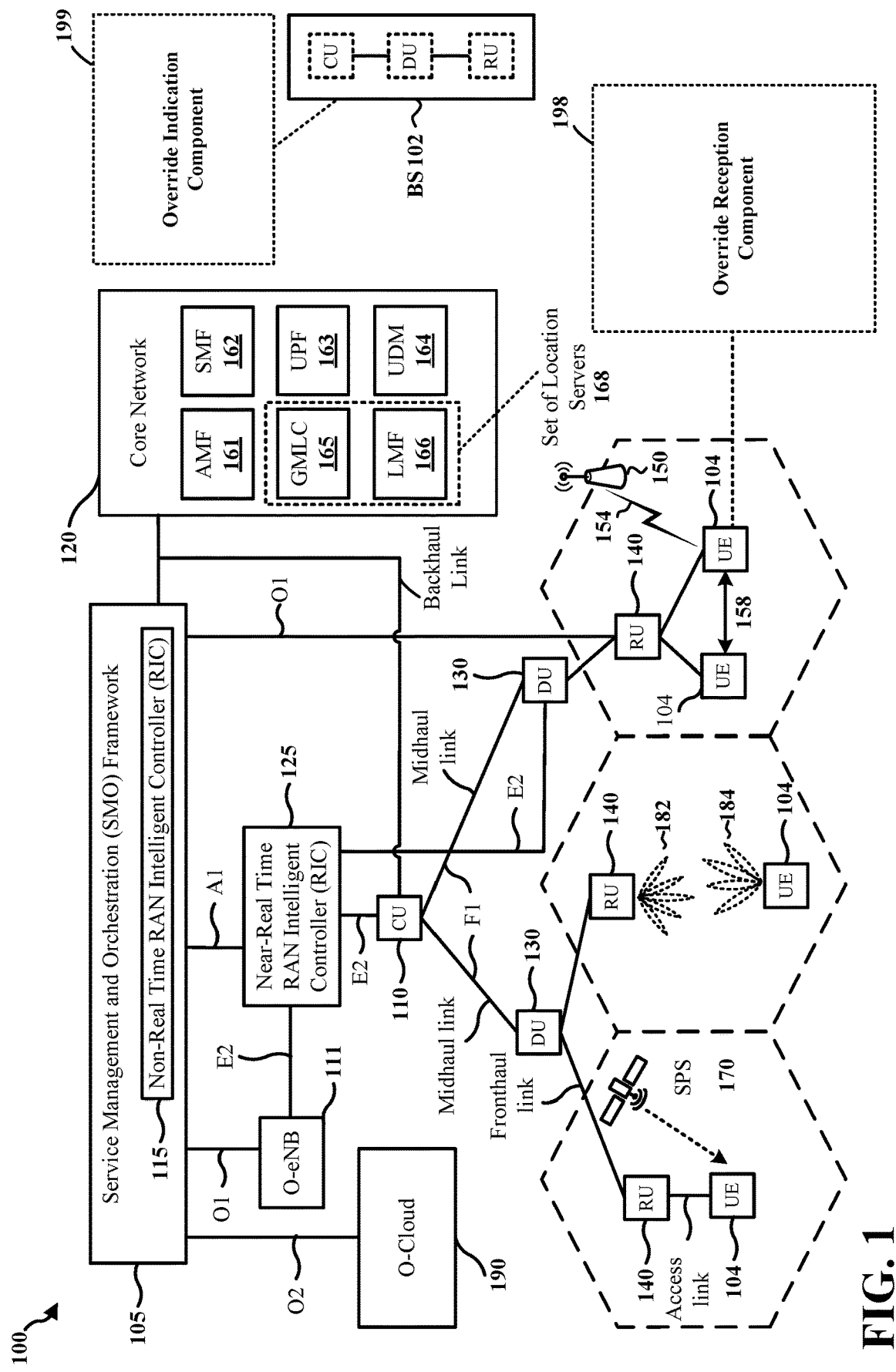
FIG. 1 is a diagram illustrating an example of a wireless communication system and an access network.

Some commercial networks may not have, or may only have a small number of, radio resource control (RRC)-configured flexible (F) symbols or slots in their slot format for power-saving purposes. However, the RRC-configured downlink or uplink symbol (or slot) may need to be differentiated among Sub-band full-duplex (SBFD)-aware UEs. Aspects presented herein provide methods and apparatus for overriding RRC-configured direction for symbols or sets for improved efficiency of wireless communication. In some aspects, the UE may receive a first time division duplex (TDD) uplink (UL) downlink (DL) slot format configuration in radio resource control (RRC) signaling. The first TDD UL DL slot format configuration may indicate types of communication for a set of symbols or a set of slots. The UE may further receive an indication of an adjusted type for at least one symbol in the set of symbols or at least one slot in the set of slots. The at least one symbol may be a downlink symbol (D symbol) or an uplink symbol (U symbol) based on the first time TDD UL DL slot format configuration, and the at least one slot may be a downlink slot (D slot) or an uplink slot (U slot) based on the first time TDD UL DL slot format configuration. The method enables transmission resources to be utilized flexibly in wireless communication according to actual operation requirements. Thus, it improves the efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer-executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an override reception component 198 that is configured to receive a first TDD UL DL slot format configuration in RRC signaling. The first TDD UL DL slot format configuration may indicate types of communication for a set of symbols or a set of slots, the types of the communication including one or more of uplink, downlink, or flexible. The override reception component 198 may be further configured to receive an indication of an adjusted type for at least one symbol in the set of symbols or at least one slot in the set of slots. The at least one symbol is a D symbol or a U symbol based on the first time TDD UL DL slot format configuration, and the at least one slot may be a D slot or a U slot (U slot) based on the first time TDD UL DL slot format configuration. In certain aspects, the base station 102 may be include an override reception component 199 that is configured to transmit, or otherwise output, a first TDD UL DL slot format configuration in RRC signaling. The first TDD UL DL slot format configuration may indicate types of communication for a set of symbols or a set of slots, the types of the communication including one or more of uplink, downlink, or flexible. The override reception component 199 may be further configured to transmit, or otherwise output, an indication of an adjusted type for at least one symbol in the set of symbols or at least one slot in the set of slots. The at least one symbol may be a D symbol or a U symbol based on the first time TDD UL DL slot format configuration, and the at least one slot may be a D slot or a U slot based on the first time TDD UL DL slot format configuration. Although the following description may be focused on 5G NR, the concepts described herein may be applicable to other similar areas, such as LTE, LTE-A, CDMA, GSM, and other wireless technologies.

Figure 2:
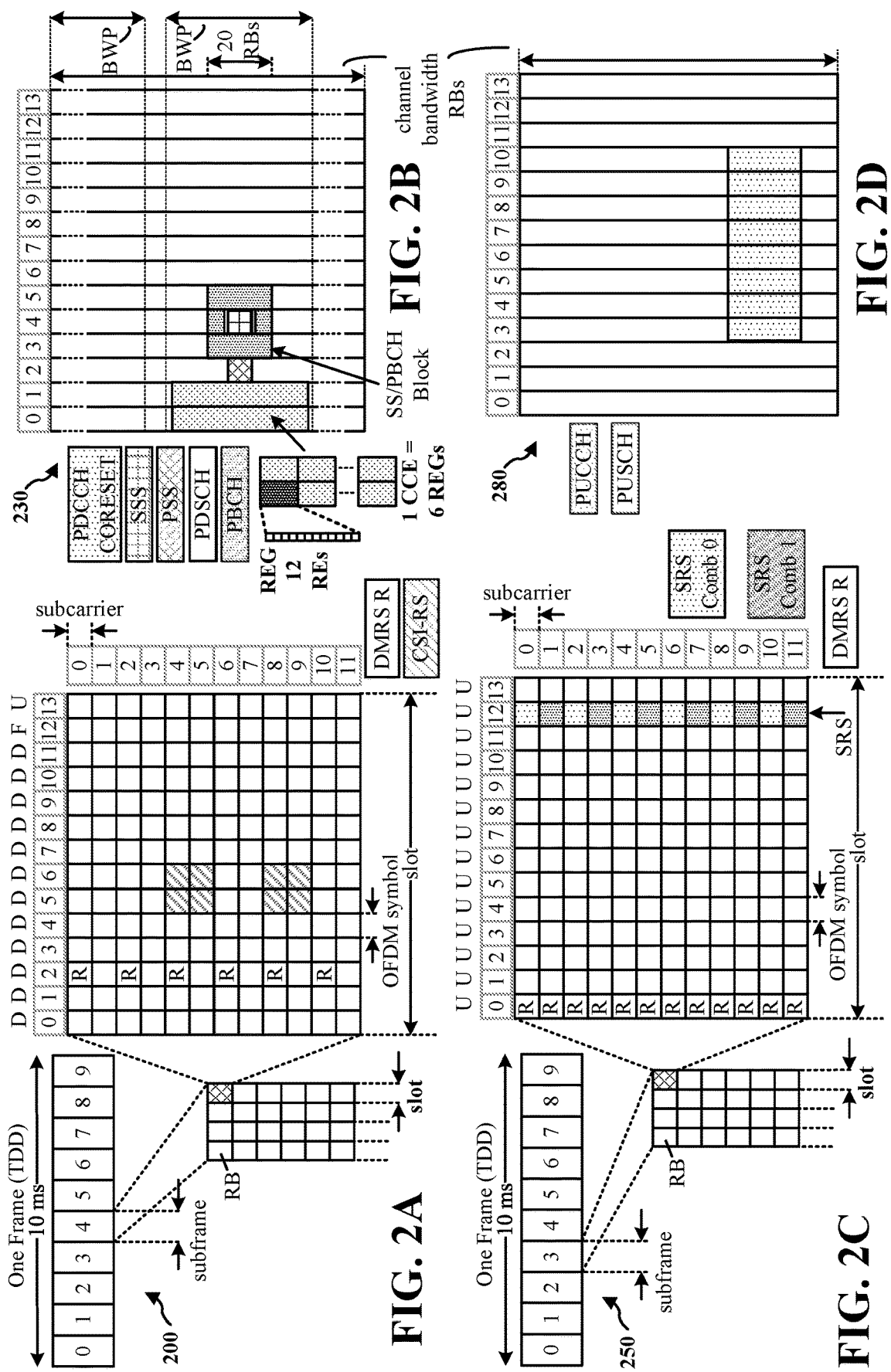
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
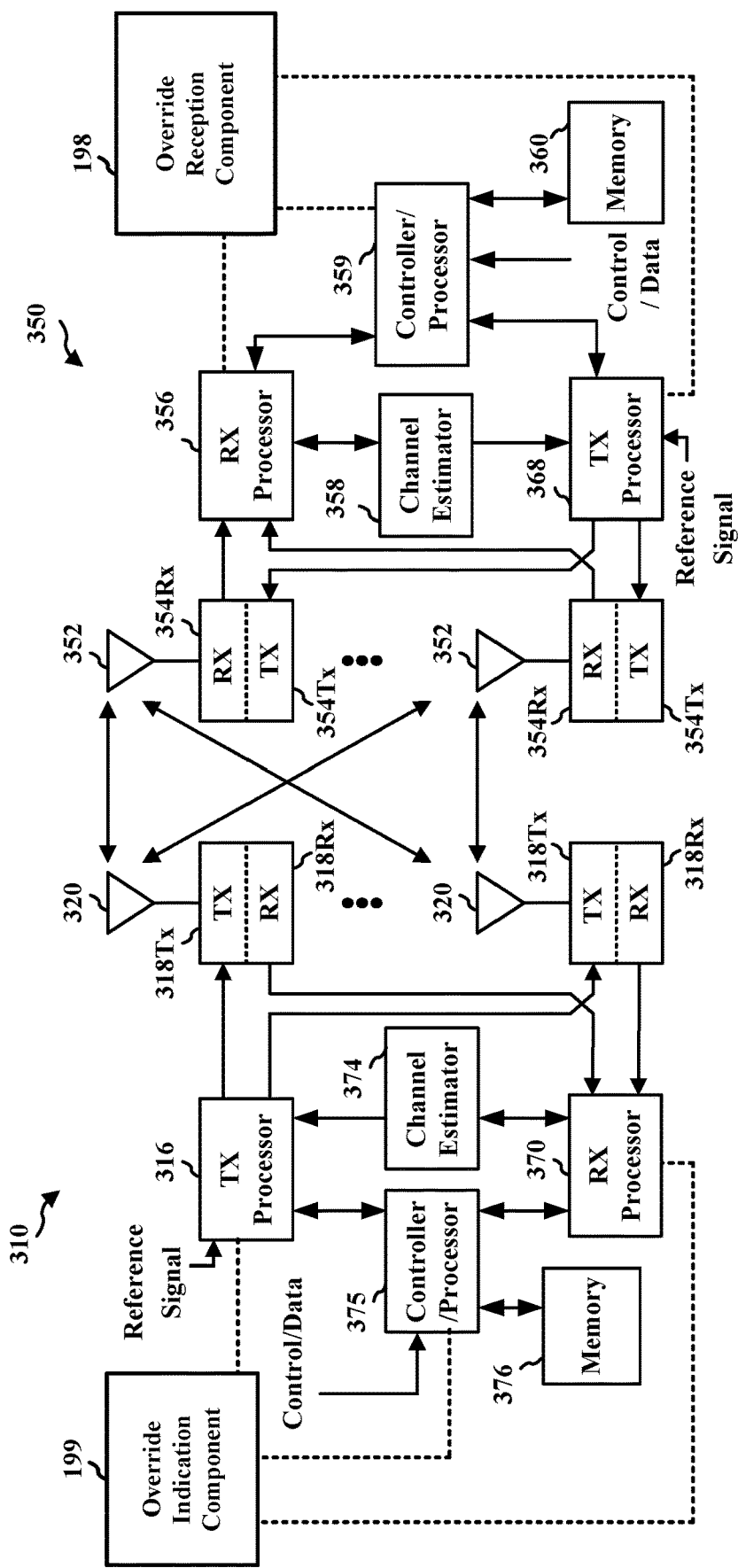
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the override reception component 198 of FIG. 1.

At least one of the TX processor 316, the RX processor 370, and the controller/processor 375 may be configured to perform aspects in connection with the override indication component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

Figure 4A:
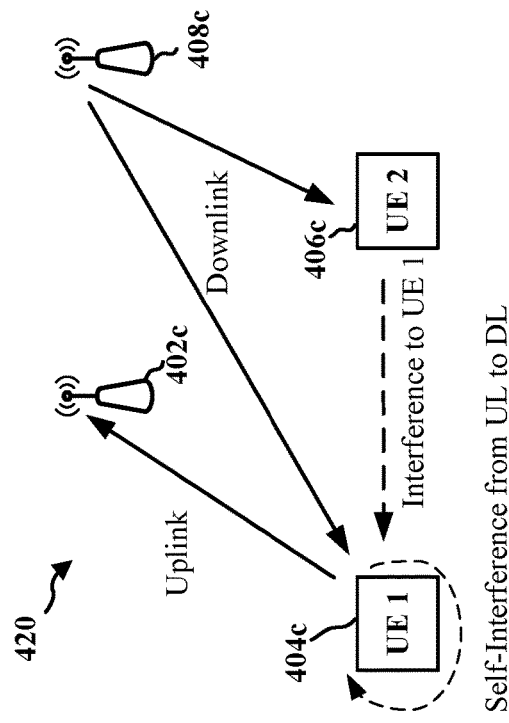
FIGS. 4A, 4B, 4C, and 4D illustrate various modes of full duplex communication.
Figure 4C:
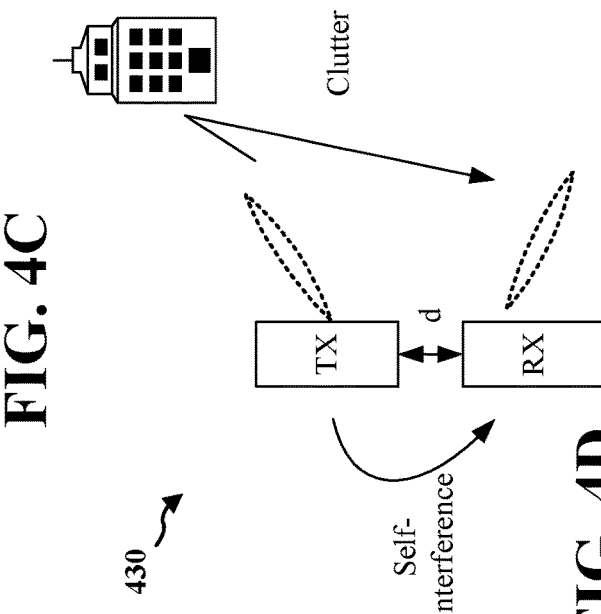
Figure 4B:
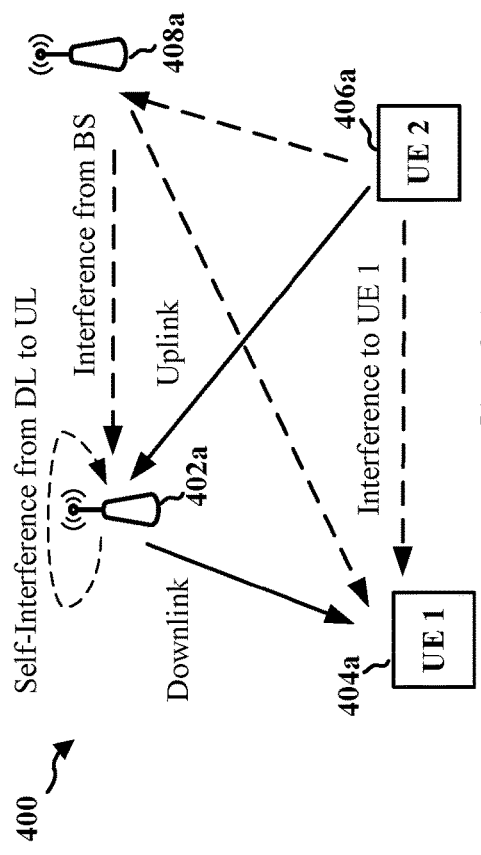

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE

406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 4D:
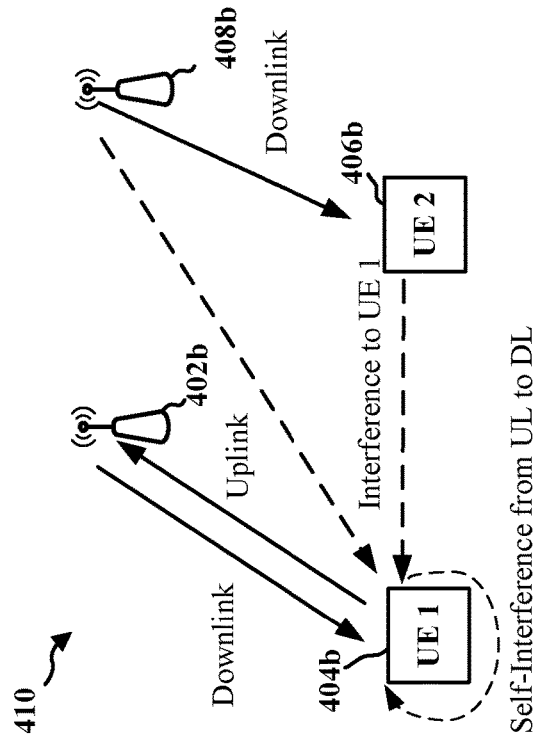

FIG. 4D illustrates an example 430 of self-interference and interference due to clutter, or reflection of a signal from a transmitter at a device that is received as interference and a receiver of the same device. The distance (d) between the transmitter and receiver may affect the amount of self-interference or clutter experienced during reception at the device. The device may be a base station or a UE, such as shown in FIG. 4A-4C, for example.

Full duplex communication may be in a same frequency band. The uplink and downlink communication may be in different frequency subbands, in the same frequency sub-band, or in partially overlapping frequency subbands. FIG. 5A illustrates a first example 500 and a second example 510 of in-band full-duplex (IBFD) resources and a third example 520 of sub-band full-duplex (SBFD) resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

FIG. 5B illustrates an example base station in which a portion of an antenna panel 575 may be used to transmit communication to UE1 and a portion of the antenna panel 585 may be used to receive communication from UE 2 in a full duplex mode.

Sub-band full-duplex (SBFD) allows for simultaneous transmission/reception of downlink (DL)/uplink (UL) on a sub-band basis. A full duplex base station may conduct simultaneous transmission and reception on the same slot. SBFD may increase the UL duty cycle, which leads to latency reduction (e.g., it is possible to receive DL signal in UL-only slots, which may enable latency savings) and UL coverage improvement. Additionally, SBFD may enhance system capacity, resource utilization and spectrum efficiency. SBFD also enables flexible and dynamic UL/DL resource adaption according to UL/DL traffic in a robust manner.

The present disclosure provides for methods and apparatus for SBFD operation at least for radio resource control (RRC)-connected state. In some aspects, the methods and apparatus may be related to scenarios where the time and frequency locations of sub-bands for SBFD operations are not known to a user equipment (UE). In these scenarios, new UE behavior may be introduced for SBFD-aware UEs. An SBFD aware UE may refer to a UE that supports receiving information about a SBFD mode of a device with which it is communicating, e.g. such as a base station. By supporting such information, the UE may be aware, e.g., may receive signaling indicating, of times when the base station will operate in a SBFD mode. Some UEs may not be SBFD-aware, and may not support the reception of information about an SBFD mode of a base station. In some aspects, only the time locations of sub-bands for SBFD operations may be known to SBFD-aware UEs. In these scenarios, new UE behaviors may be introduced for SBFD-aware UEs based on the time location of sub-bands for SBFD operations. In some aspects, time and frequency locations of subbands for SBFD operation may be known or provided to SBFD-aware UEs.

A UE may receive a configuration that indicates a TDD UL/DL configuration for a period of time, e.g., such as for a number of symbols or a number of slots. As an example, the UE may receive, e.g., in RRC signaling, a parameter tdd-UL-DL-ConfigurationCommon and/or a parameter tdd-UL-DL-ConfigurationDedicated.

Some wireless network operators may not have, or may only have a small number of, RRC-configured flexible (F) symbols or slots in their slot formats, e.g., in some commercial networks. These networks may only contain RRC-configured downlink (D) or uplink (U) symbol or slot to reduce the number of slot formats and hence reduce the variation of the slot format scenarios that the scheduler needs to consider, which may save UE power (e.g., by switching off Tx chain at the pre-configured D slots). However, the RRC-configured D or U symbol (or slot) may need to be differentiated among SBFD-aware UEs.

In one configuration, a base station may transmit a signal to a UE to override an RRC-configured type of a symbol or a slot.

FIG. 6A is a diagram 600 illustrating overriding RRC configuration type in accordance with one aspect of the present disclosure. In the example of FIG. 6A, a signal is provided to override the downlink (D) type of symbols/slots 602, 604 to an uplink (U) type of symbols/slots 612, 614, respectively. The base station may operate in SBFD mode, sending downlink transmission to one UE and receiving uplink transmission from another UE. FIG. 6B is a diagram 620 illustrating overriding RRC configuration type in accordance with another aspect of the present disclosure. In the example of FIG. 6B, a signal is provided to override the downlink (D) type of symbols/slots 622, 624 to a new type (i.e., an SBFD type) of symbol/slot, as shown in 632, 634, respectively. In another configuration, a signal may be provided to indicate the time locations of sub-bands for SBFD operations. FIG. 6C is a diagram 640 illustrating overriding RRC configuration direction in accordance with yet another aspect of the present disclosure. In the example of FIG. 6C, a signal is provided to indicate the time locations of sub-bands (i.e., locations corresponding to symbols/slots 642, 644) for SBFD operations. The type of the corresponding symbols/slots may be changed from, for example, a D symbol/slot, as indicated by 642, 644, to a flexible symbol/slot, as indicated by 652, 654, respectively, for SBFD operation.

The signaling to override the RRC-configured direction/type for a TDD UL/DL format and to indicate only the time locations of sub-bands for SBFD operations may be implemented in various ways. In one configuration, the signaling may be transmitted via an RRC message. A new information element (IE) may be provided in an RRC message for SBFD-aware UEs. For example, the new IE may be referred to as a TDD-UL-DL-ConfigurationCommon-SBFD or TDD-UL-DL-ConfigurationDedicated-SBFD or by another name and may be received in the RRC message. In one configuration, parameter TDD-UL-DL-ConfigurationCommon or TDD-UL-DL-ConfigurationDedicated in an RRC message may be used. The latest version of parameter TDD-UL-DL-ConfigurationCommon or TDD-UL-DL-ConfigurationDedicated may update/override the older version of parameter TDD-UL-DL-ConfigurationCommon or TDD-UL-DL-ConfigurationDedicated at least for a primary cell (PCell). When signaling through RRC, the RRC message may be broadcast or multicast (e.g., via SIB). The intended UE IDs or UE group ID may be signaled as well. In one example, the RRC message may be a unicast message that is UE dedicated.

In one configuration, the signaling may be transmitted via DCI. In one example, the DCI may have an enhanced DCI format 2_0, such as SFI, which allows overriding parameter TDD-UL-DL-ConfigurationCommon or TDD-UL-DL-ConfigurationDedicated. In one example, other DCI formats may be used. These formats may include both existing and new DCI formats, which carry the updated parameter TDD-UL-DL-ConfigurationCommon or TDD-UL-DL-ConfigurationDedicated. The DCI formats may be UE dedicated or group common.

In one configuration, the signaling may be transmitted via MAC-CE. In one example, the MAC-CE may have an enhanced format, which allows overriding parameter TDD-UL-DL-ConfigurationCommon or TDD-UL-DL-ConfigurationDedicated. In one example, other MAC-CE formats may be used. These formats may include both existing and new MAC-CE formats, which carry the updated parameter TDD-UL-DL-ConfigurationCommon or TDD-UL-DL-ConfigurationDedicated. The MAC-CE formats may be UE dedicated or group common, for example.

In one configuration, when signaling to override RRC-configured symbol/slot direction/type and to indicate only the time locations of sub-bands for SBFD operation, the updated parameter TDD-UL-DL-ConfigurationCommon or TDD-UL-DL-ConfigurationDedicated may have a symbol/slot direction/type or D, U, or F types. For example, when signaling to override RRC-configured symbol/slot direction/type, an RRC D symbol may be updated/override to an RRC U symbol, an RRC U symbol may be updated/override to an RRC D symbol. When signaling to indicate only the time locations of sub-bands for SBFD operation, an RRC D symbol may be updated/override to an RRC F symbol, and an RRC U symbol may be updated/override to an RRC F symbol.

In another configuration, when signaling to override RRC-configured symbol/slot direction/type and to indicate only the time locations of sub-bands for SBFD operation, the updated parameter TDD-UL-DL-ConfigurationCommon or TDD-UL-DL-ConfigurationDedicated may only have a new symbol/slot direction/type. For example, the update parameter TDD-UL-DL-ConfigurationCommon or TDD-UL-DL-ConfigurationDedicated may have an SBFD type for a UE.

To protect common DL channels/RSs, a specific rule may be defined that a UE is not expected to receive a signaling or an indicated symbol/slot format that overrides an RRC D tdd-UL-DL-ConfigCommon symbol/slot on common DL channel symbols/slots for SBFD-aware UE. These symbols/slots may include, but not limited to, SSB symbols/slots, CORESET0 symbols/slots, common search space (CSS) physical downlink control channel (PDCCH) symbols/slots, CSS-PDCCH scheduled physical downlink shared channel (PDSCH) symbols/slots, common RS (e.g., TRS), and common semi-persistent scheduling occasions (e.g., for broadcasting signals).

To protect high priority UL channel symbols/slots for SBFD-aware UEs, a rule may provide that a UE is not expected to receive a signaling or an indicated symbol/slot format that overrides an RRC U tdd-UL-DL-ConfigCommon symbol/slot on some high priority UL channel symbols/slots for SBFD-aware UEs. These symbols/slots may include, but not limited to, RO symbols/slots, SRS symbols/slots, and PUCCH symbols/slots. If a UE receives signaling that overrides such a symbol or slot, the UE may identify an error or may ignore the change to the type of the symbol or slot.

Figure 7:
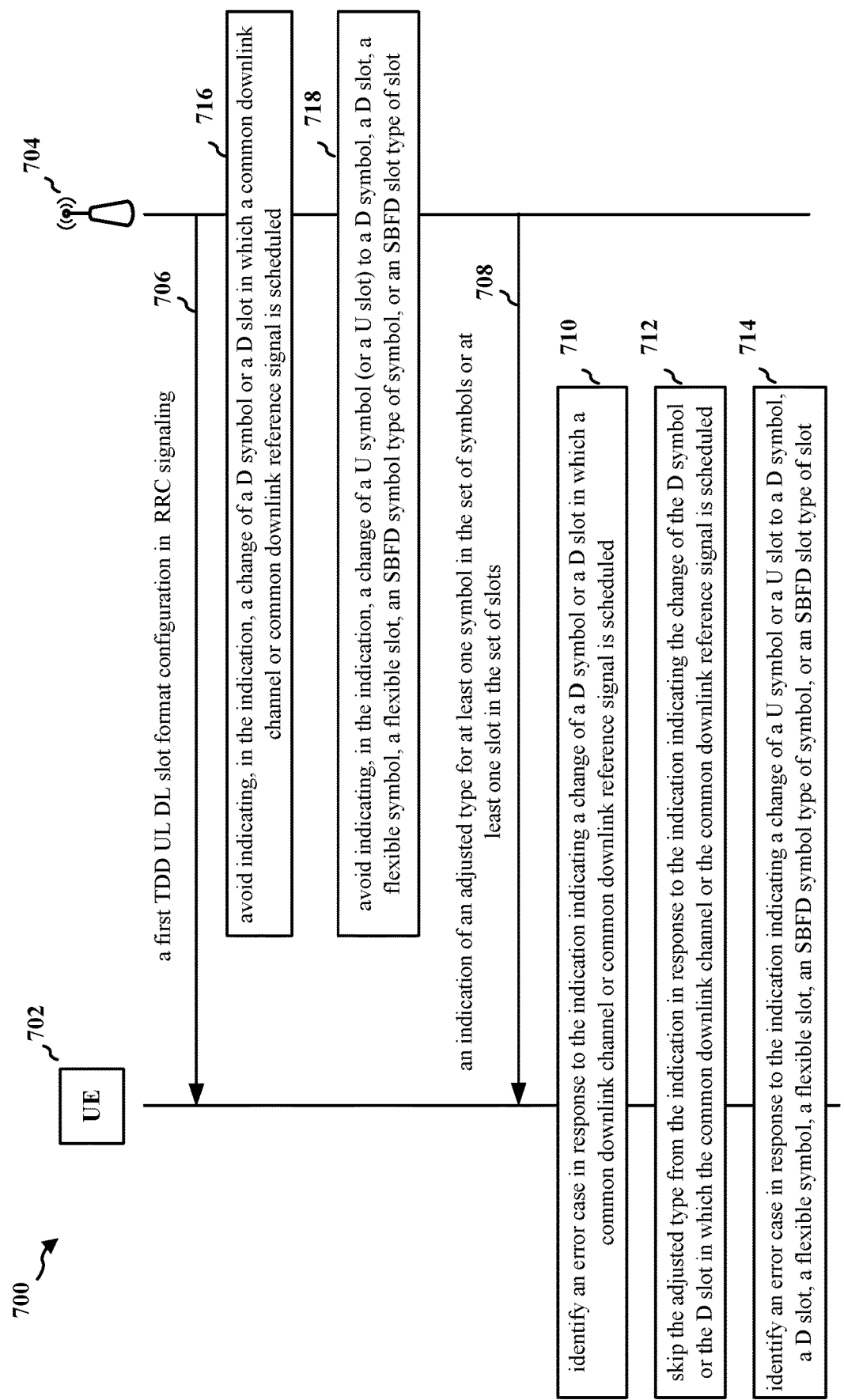
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Although aspects are described for a base station 704, the aspects may be performed by a base station in aggregation and/or by one or more components of a base station 704 (e.g., such as a CU 110, a DU 130, and/or an RU 140). As shown in FIG. 7, a UE 702 may receive, at 706, a first TDD UL DL slot format configuration in radio resource control (RRC) signaling. The first TDD UL DL slot format configuration may indicate types of communication for a set of symbols or a set of slots. The types of communication for a set of symbols (or a set of slots) may include the directions of communication for the set of symbols (or the set of slots). For example, the types of communication for a set of symbols (or a set of slots) may be the downlink type or the uplink type.

At 708, the UE 702 may receive an indication of an adjusted type (e.g., a change to the previously indicated symbol/slot type) for at least one symbol in the set of symbols or at least one slot in the set of slots. The at least one symbol may be a downlink symbol (D symbol) or an uplink symbol (U symbol) based on the first time TDD UL DL slot format configuration, and the at least one slot may be a downlink slot (D slot) or an uplink slot (U slot) based on the first time TDD UL DL slot format configuration.

At 710, the UE 702 may identify an error case in response to the indication indicating a change of a D symbol or a D slot in which a common downlink channel or common downlink reference signal is scheduled. The change may include the change to a U symbol, a U slot, a flexible symbol, a flexible slot, an SBFD type of symbol, or an SBFD type of slot.

At 712, the UE 702 may skip the adjusted type from the indication in response to the indication indicating the change of the downlink symbol or the downlink slot in which the common downlink channel or the common downlink reference signal is scheduled.

At 714, the UE 702 may identify an error case in response to the indication indicating a change of a U symbol or a U slot to a D symbol, a D slot, a flexible symbol, a flexible slot, an SBFD type of symbol, or an SBFD type of slot. The UE 702 may identify the error case based on the uplink symbol or the uplink slot being scheduled with at least one of: a random-access occasion (RO), an SRS, or a PUCCH.

At 716, the base station 704 may avoid indicating, in the indication, a change of a D symbol or a D slot in which a common downlink channel or common downlink reference signal is scheduled. The change may include the change to a U symbol, a U slot, a flexible symbol, a flexible slot, an SBFD type of symbol, or an SBFD type of slot.

At 718, the base station 704 may avoid indicating, in the indication, a change of a U symbol or a U slot to a D symbol, a D slot, a flexible symbol, a flexible slot, an SBFD type of symbol, or an SBFD type of slot. The base station 704 may avoid the change based on the U symbol or the U slot being scheduled with at least one of: a RO, an SRS, or a PUCCH.

Figure 8:
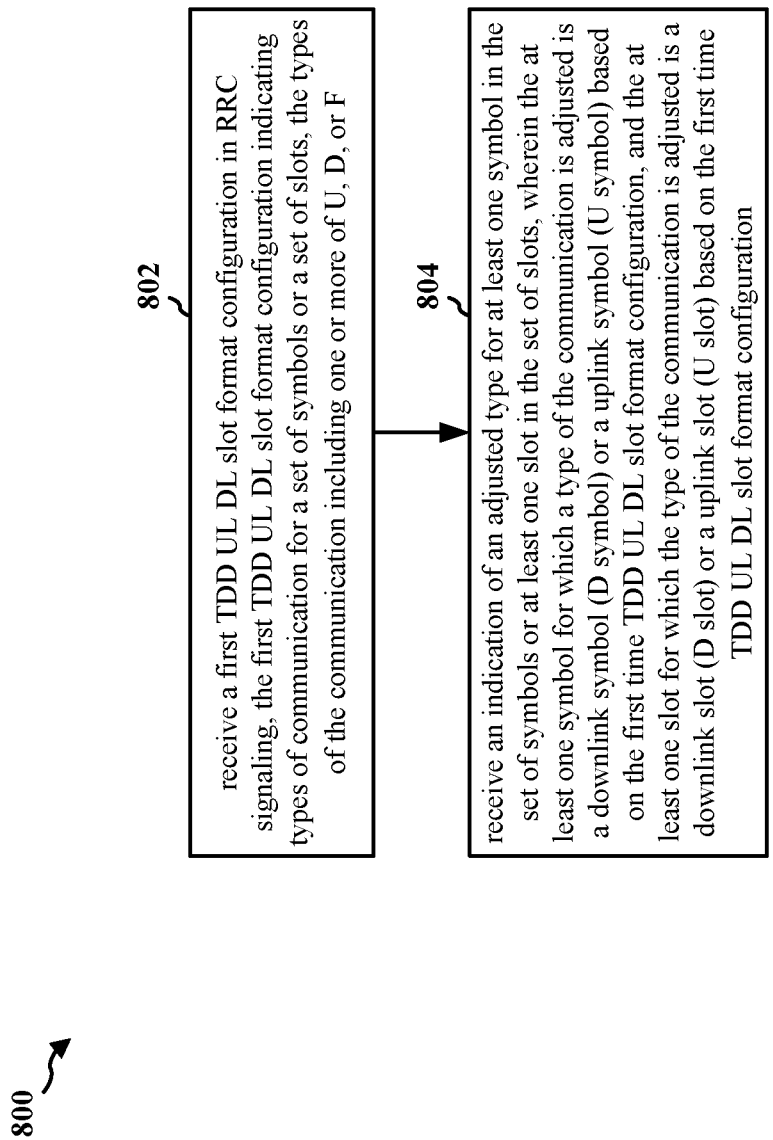
FIG. 8 is the first flowchart illustrating methods of wireless communication at a UE in accordance with various aspects of the present disclosure.

FIG. 8 is a flowchart 800 illustrating methods of wireless communication at a UE in accordance with various aspects of the present disclosure. The method may be performed by a UE. The UE may be the UE 104, 350, 702, or the apparatus 1204 in the hardware implementation of FIG. 12. The method enables the signaling to override RRC configured transmission direction of a symbol or a slot and to indicate time locations of subbands for SBFD operation. The method enables transmission resources to be utilized flexibly in wireless communication according to actual operation requirements. Thus, it improves the efficiency of wireless communication.

As shown in FIG. 8, at 802, the UE may receive a first TDD UL DL slot format configuration in radio resource control (RRC) signaling. The first TDD UL DL slot format configuration may indicate directions of communication for a set of symbols or a set of slots, e.g., a type of communication for a set of symbols or a set of slots, the types of the communication including one or more of uplink, downlink, or flexible. The network entity may be a base station, or a component of a base station, in the access network of FIG. 1 or a core network component (e.g., base station 102, 310; base station 704; or the network entity 1202 in the hardware implementation of FIG. 12). FIGS. 6A, 6B, 6C, and 7 illustrate various aspects of the steps in connection with flowchart 800. For example, referring to FIG. 7, the UE 702 may, at 706, receive a first TDD UL DL slot format configuration in RRC signaling from a network entity (base station 704). Referring to FIG. 6A, the first TDD UL DL slot format configuration may indicate directions of communication for a set of symbols or a set of slots (e.g., downlink "D" for symbols/slots 602, 604).

At 804, the UE may receive an indication of an adjusted type for at least one symbol in the set of symbols or at least one slot in the set of slots. The at least one slot for which the type of the communication is adjusted is a downlink slot (D slot) or a uplink slot (U slot) based on the first time TDD UL DL slot format configuration. For example, referring to FIG. 7, the UE 702 may receive, at 708, an indication of an adjusted type for at least one symbol in the set of symbols or at least one slot in the set of slots from the network entity (base station 704).

Figure 9:
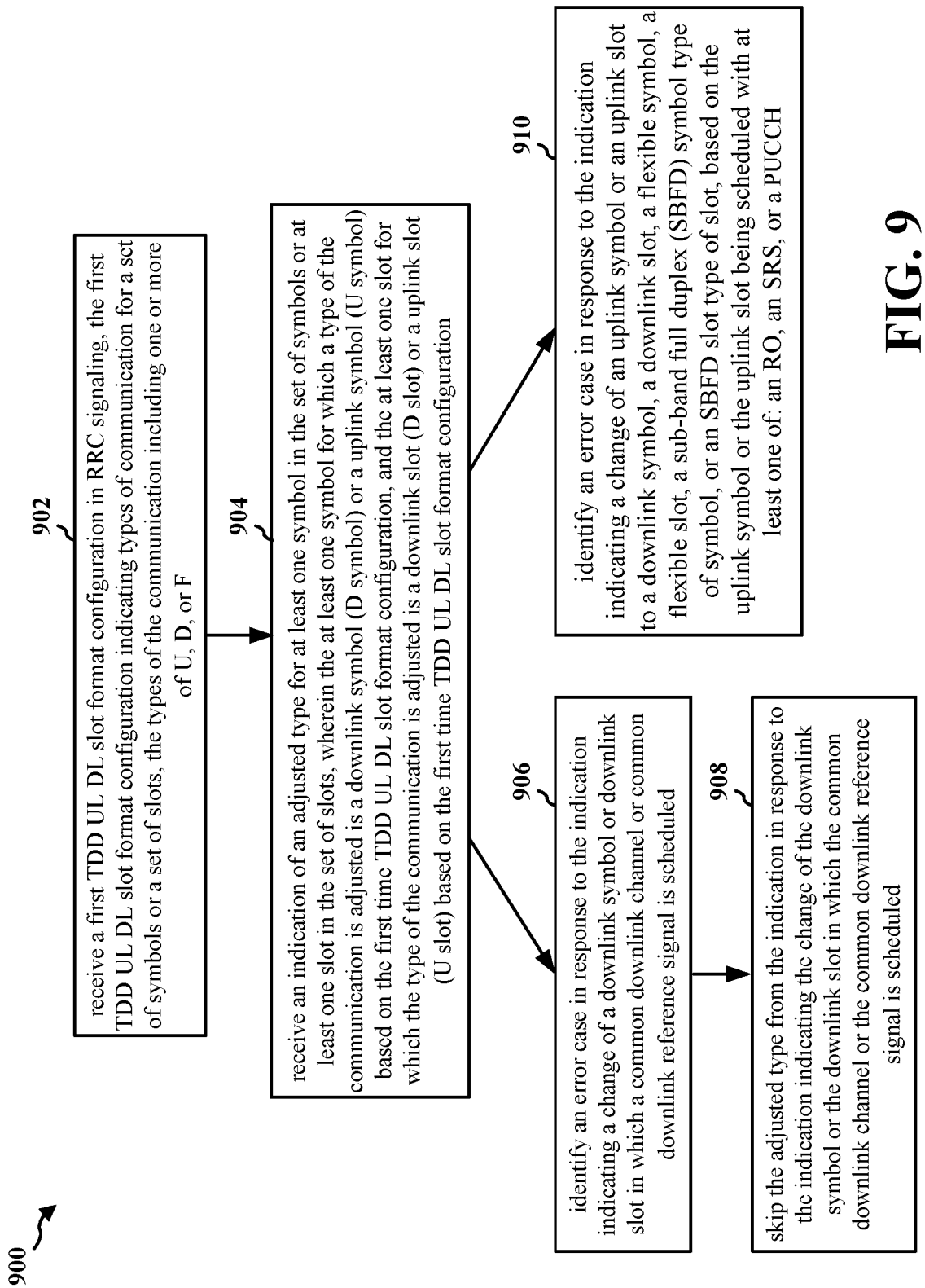
FIG. 9 is the second flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE. The UE may be the UE 104, 350, 702, or the apparatus 1204 in the hardware implementation of FIG. 12. The method enables the signaling to override RRC configured transmission direction of a symbol or a slot and to indicate time locations of subbands for SBFD operation. The method enables transmission resources to be utilized flexibly in wireless communication according to actual operation requirements. Thus, it improves the efficiency of wireless communication.

As shown in FIG. 9, at 902, the UE may receive a first TDD UL downlink DL slot format configuration in RRC signaling. The first TDD UL DL slot format configuration may indicate directions of communication for a set of symbols or a set of slots, e.g., a type of communication for a set of symbols or a set of slots, the types of the communication including one or more of uplink, downlink, or flexible. The network entity may be a base station, or a component of a base station, in the access network of FIG. 1 or a core network component (e.g., base station 102, 310; base station 704; or the network entity 1202 in the hardware implementation of FIG. 12). FIGS. 6A, 6B, 6C, and 7 illustrate various aspects of the steps in connection with flowchart 900. For example, referring to FIG. 7, the UE 702 may, at 706, receive a first TDD UL DL slot format configuration in RRC signaling from a network entity (base station 704). Referring to FIG. 6A, the first TDD UL DL slot format configuration may indicate directions of communication for a set of symbols or a set of slots (e.g., downlink direction "D" for symbols/slots 602, 604).

At 904, the UE may receive an indication of an adjusted type for at least one symbol in the set of symbols or at least one slot in the set of slots. The at least one slot for which the type of the communication is adjusted is a downlink slot (D slot) or a uplink slot (U slot) based on the first time TDD UL DL slot format configuration. For example, referring to FIG. 7, the UE 702 may receive, at 708, an indication of an adjusted type for at least one symbol in the set of symbols or at least one slot in the set of slots from the network entity (base station 704).

In some aspects, the adjusted type may be for SBFD operation of the network entity in the at least one symbol or the at least one slot. For example, referring to FIG. 6C, the adjusted type may be for SBFD operation of the network entity in the at least one symbol or the at least one slot. That is, the symbol/slot type may be changed from a D symbol/slot, as indicated at 642, 644, to a flexible symbol/slot, as indicated by 652, 654, for SBFD operation.

In some aspects, the indication may be included in an RRC message. The RRC message may include at least one of: a second TDD UL DL slot format configuration that is common to multiple UEs or all UEs in a cell or is dedicated for the UE at least for a primary cell (PCell) for an SBFD-aware UE, or an updated TDD UL DL slot format configuration that is common to multiple UEs or all UEs in the cell or is dedicated for the UE at least for a PCell for an SBFD-aware UE. For example, referring to FIG. 7, when the UE 702, receives, at 708, the indication of an adjusted type, the indication may be included in an RRC message. The RRC message may include at least one of: a second TDD UL DL slot format configuration (e.g., a new TDD-UL-DL-ConfigurationCommon or TDD-UL-DL-Configuration-Dedicated parameter) that is common to multiple UEs or all UEs in a cell or is dedicated for the UE at least for a PCell for an SBFD-aware UE, or an updated TDD UL DL slot format configuration (an updated TDD-UL-DL-ConfigurationCommon or TDD-UL-DL-ConfigurationDedicated parameter) that is common to multiple UEs or all UEs in the cell or is dedicated for the UE at least for a PCell for an SBFD-aware UE.

In some aspects, the RRC message may be included in a broadcast, multicast, or unicast. In some aspects, the RRC message may further include one or more UE IDs or one or more UE group IDs for the intended UEs of the RRC message. For example, referring to FIG. 7, when the UE 702, receives, at 708, the indication of an adjusted type that is included in an RRC message, the RRC message may be included in a broadcast, multicast, or unicast, and the RRC message may further include one or more UE IDs or one or more UE group IDs for the intended UEs (e.g., the UE 702) of the RRC message.

In some aspects, the indication may be included in downlink control information (DCI). In some aspects, the DCI may be one of: DCI that has an enhanced DCI format that allows overriding a TDD UL DL slot format configuration in the DCI; DCI that carries an updated TDD UL DL slot format configuration; or DCI that has a DCI format that is UE dedicated or group common. For example, referring to FIG. 7, when the UE 702, receives, at 708, the indication of an adjusted type, the indication may be included in DCI, and the DCI may be one of: DCI that has an enhanced DCI format that allows overriding a TDD UL DL slot format configuration (e.g., the TDD-UL-DL-ConfigurationCommon or TDD-UL-DL-ConfigurationDedicated parameter) in the DCI; DCI that carries an updated TDD UL DL slot format configuration (e.g., an updated TDD-UL-DL-ConfigurationCommon or TDD-UL-DL-ConfigurationDedicated parameter); or DCI that has a DCI format that is UE dedicated or group common.

In some aspects, the indication may be included in a medium access control-control element (MAC-CE). In some aspects, the MAC-CE may be one of: a MAC-CE that has an enhanced MAC-CE format that allows overriding a TDD UL DL slot format configuration in the MAC-CE; a MAC-CE that carries an updated TDD UL DL slot format configuration; or a MAC-CE that has a MAC-CE format that is UE dedicated or group common. For example, referring to FIG. 7, when the UE 702, receives, at 708, the indication of an adjusted type, the indication may be included in a MAC-CE, and the MAC-CE may be one of: a MAC-CE that has an enhanced MAC-CE format that allows overriding a TDD UL DL slot format configuration (e.g., the TDD-UL-DL-ConfigurationCommon or TDD-UL-DL-ConfigurationDedicated parameter) in the MAC-CE; a MAC-CE that carries an updated TDD UL DL slot format configuration (e.g., an updated TDD-UL-DL-ConfigurationCommon or TDD-UL-DL-ConfigurationDedicated parameter); or a MAC-CE that has a MAC-CE format that is UE dedicated or group common.

In some aspects, the adjusted type that is included in the indication may indicate one or more of: a previously indicated downlink symbol changed to the uplink symbol, the previously indicated downlink symbol changed to the flexible symbol, a previously indicated downlink slot changed to the uplink slot, the previously indicated downlink slot changed to the flexible slot, a previously indicated uplink symbol changed to the downlink symbol, the previously indicated uplink symbol changed to the flexible symbol, a previously indicated uplink slot changed to the downlink slot, or the previously indicated uplink slot changed to the flexible slot. For example, referring to FIG. 7, the UE 702, receives, at 708, the indication of an adjusted type, the adjusted type that is included in the indication may indicate one or more of: a previously indicated downlink symbol changed to the uplink symbol, the previously indicated downlink symbol changed to the flexible symbol, a previously indicated downlink slot changed to the uplink slot, the previously indicated downlink slot changed to the flexible slot, a previously indicated uplink symbol changed to the downlink symbol, the previously indicated uplink symbol changed to the flexible symbol, a previously indicated uplink slot changed to the downlink slot, or the previously indicated uplink slot changed to the flexible slot. In one example, referring to FIG. 6A, the adjusted type may indicate a previously indicated downlink symbol/slot, as indicated by 602, 604, changed to an uplink symbol/slot, as indicated by 612, 614. In another example, referring to FIG. 6C, the adjusted type may indicate a previously indicated downlink symbol/slot, as indicated by 642, 644, changed to a flexible symbol/slot, as indicated by 652, 654.

In some aspects, the indication may indicate the adjusted type as an SBFD type of symbol or an SBFD type of slot. For example, referring to FIG. 6C, the indication may indicate the adjusted type as an SBFD type of symbol or an SBFD type of slot, as indicated by 652, 654.

At 906, the UE may identify an error case in response to the indication indicating a change of a downlink symbol or downlink slot in which a common downlink channel or common downlink reference signal is scheduled. The change may include the change to an uplink symbol, an uplink slot, a flexible symbol, a flexible slot, an SBFD type of symbol, or an SBFD type of slot. For example, referring to FIG. 7, the UE 702 may, at 710, identify an error case in response to the indication indicating a change of a D symbol or a D slot in which a common downlink channel or common downlink reference signal is scheduled.

At 908, the UE may skip the adjusted type from the indication in response to the indication indicating the change of the downlink symbol or the downlink slot in which the common downlink channel or the common downlink reference signal is scheduled. For example, referring to FIG. 7, the UE 702 may, at 712, skip the adjusted type from the indication in response to the indication indicating the change of the D symbol or the D slot in which the common downlink channel or the common downlink reference signal is scheduled.

In some aspects, the common downlink channel or the common downlink reference signal may include at least one of: a synchronization signal block (SSB), a control resource set 0 (CORESET0), a common search space (CSS) physical downlink control channel (PDCCH), a CSS PDCCH scheduled physical downlink shared channel (PDSCH), a reference signal that is common to multiple UEs or all UEs in a cell, or semi-persistent scheduling occasions that are common to the multiple UEs or all UEs in the cell. For example, referring to FIG. 7, when the UE 702 identify, at 710, an error case in response to the indication indicating a change of a D symbol or a D slot in which a common downlink channel or common downlink reference signal is scheduled, or when the UE 702 skips, at 712, the adjusted type from the indication in response to the indication indicating the change of the D symbol or the D slot in which the common downlink channel or the common downlink reference signal is scheduled, the common downlink channel or the common downlink reference signal may include at least one of: an SSB, a CORESET0, a CSS PDCCH, a CSS PDCCH scheduled PDSCH, a reference signal that is common to multiple UEs or all UEs in a cell, or semi-persistent scheduling occasions that are common to the multiple UEs or all UEs in the cell.

At 910, the UE may identify an error case in response to the indication indicating a change of an uplink symbol or an uplink slot to a downlink symbol, a downlink slot, a flexible symbol, a flexible slot, an SBFD type of symbol, or an SBFD type of slot. The UE may identify the error case based on the uplink symbol or the uplink slot being scheduled with at least one of: a RO, an SRS, or a PUCCH. For example, referring to FIG. 7, the UE 702 may, at 714, identify an error case in response to the indication indicating a change of an uplink symbol or an uplink slot to a downlink symbol, a downlink slot, a flexible symbol, a flexible slot, an SBFD type of symbol, or an SBFD type of slot.

Figure 10:
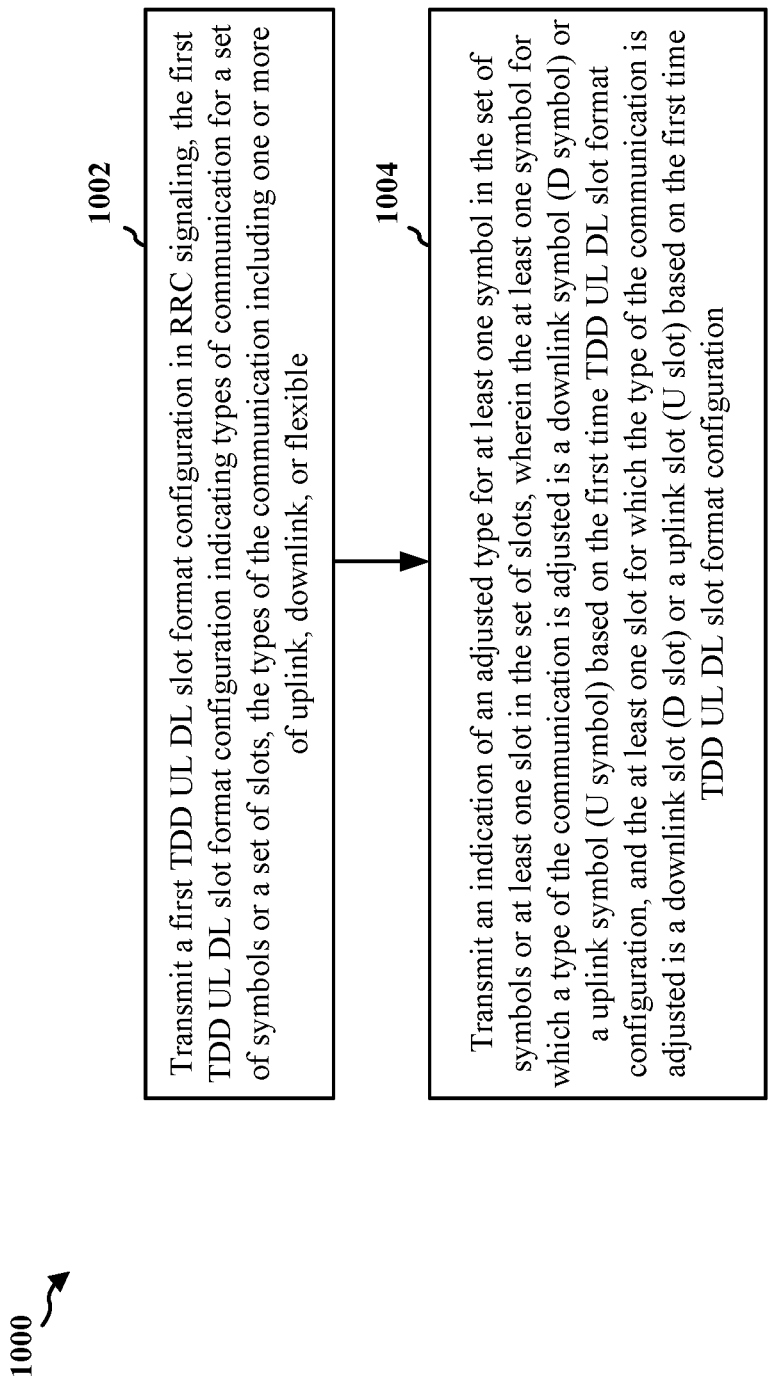
FIG. 10 is the first flowchart illustrating methods of wireless communication at a network entity in accordance with various aspects of the present disclosure.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 1202 in the hardware implementation of FIG. 12). The method enables the signaling to override RRC configured transmission direction of a symbol or a slot and to indicate time locations of subbands for SBFD operation. The method enables transmission resources to be utilized flexibly in wireless communication according to actual operation requirements. Thus, it improves the efficiency of wireless communication.

As shown in FIG. 10, at 1002, the network entity may transmit a first TDD UL DL slot format configuration in RRC signaling. The first TDD UL DL slot format configuration may indicate directions of communication for a set of symbols or a set of slots, e.g., a type of communication for a set of symbols or a set of slots, the types of the communication including one or more of uplink, downlink, or flexible. The network entity may transmit the first TDD UL DL slot format configuration to a UE. The UE may be the UE 104, 350, 702, or the apparatus 1204 in the hardware implementation of FIG. 12. FIGS. 6A, 6B, 6C, and 7 illustrate various aspects of the steps in connection with flowchart 1000. For example, referring to FIG. 7, the network entity (base station 704) may, at 706, transmit a first TDD UL DL slot format configuration in RRC signaling. Referring to FIG. 6A, the first TDD UL DL slot format configuration may indicate directions of communication for a set of symbols or a set of slots (e.g., downlink direction "D" for symbols/slots 602, 604).

At 1004, the network entity may transmit an indication of an adjusted type for at least one symbol in the set of symbols or at least one slot in the set of slots. The at least one symbol for which a type of the communication is adjusted may be a D symbol or a U symbol based on the first time TDD UL DL slot format configuration. The at least one slot for which a type of the communication is adjusted may be a D slot or a U slot based on the first time TDD UL DL slot format configuration. For example, referring to FIG. 7, the network entity (base station 704) may transmit, at 708, an indication of an adjusted type for at least one symbol in the set of symbols or at least one slot in the set of slots from the network entity.

Figure 11:
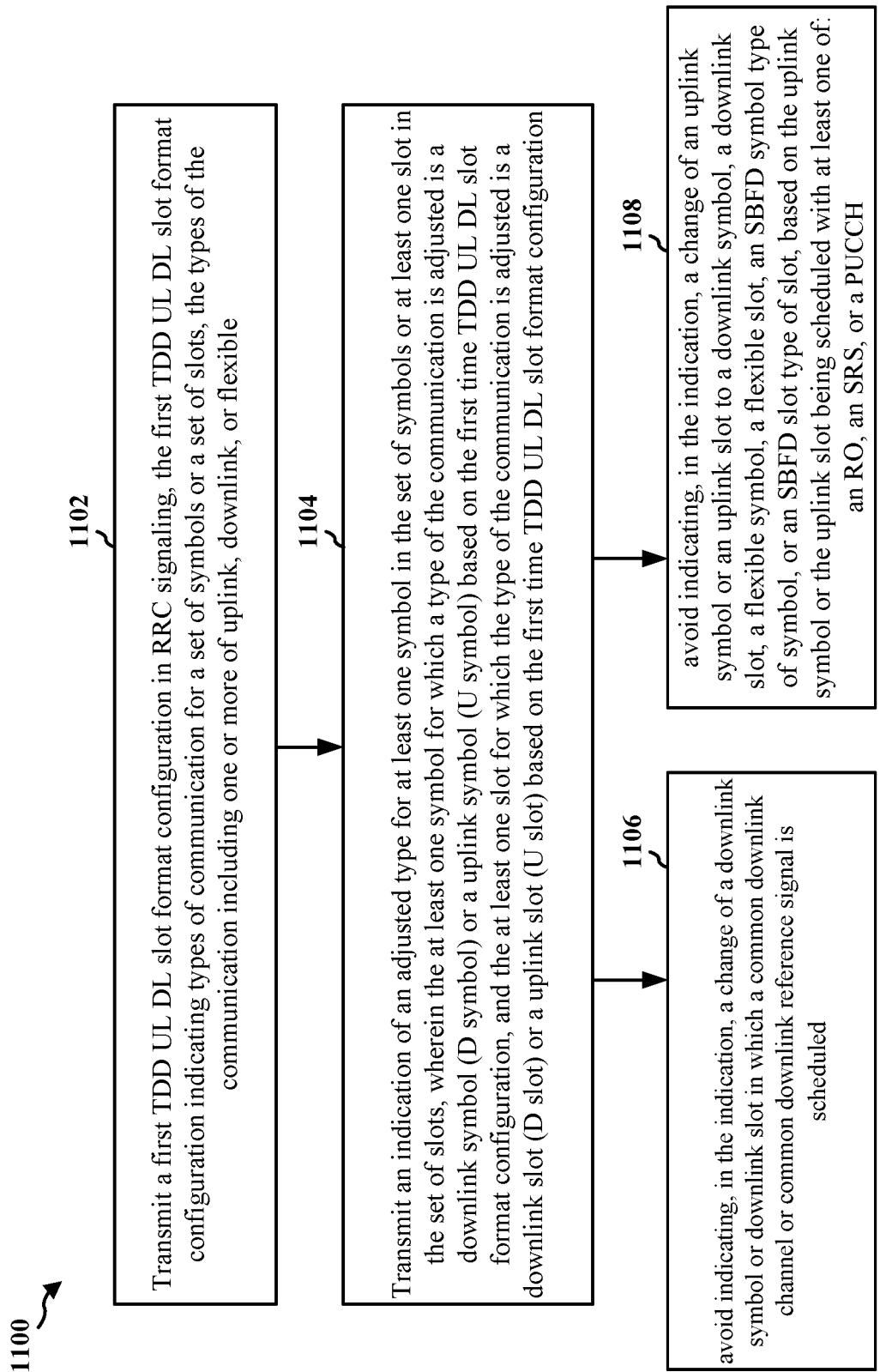
FIG. 11 is the first flowchart illustrating methods of wireless communication at a network entity in accordance with various aspects of the present disclosure.

FIG. 11 is a flowchart 1100 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 1202 in the hardware implementation of FIG. 12). The method enables the signaling to override RRC configured transmission direction of a symbol or a slot and to indicate time locations of subbands for SBFD operation. The method enables transmission resources to be utilized flexibly in wireless communication according to actual operation requirements. Thus, it improves the efficiency of wireless communication.

As shown in FIG. 11, at 1102, the network entity may transmit a first TDD UL DL slot format configuration in RRC signaling. The first TDD UL DL slot format configuration may indicate directions of communication for a set of symbols or a set of slots, e.g., a type of communication for a set of symbols or a set of slots, the types of the communication including one or more of uplink, downlink, or flexible. The network entity may transmit the first TDD UL DL slot format configuration to a UE. The UE may be the UE 104, 350, 702, or the apparatus 1204 in the hardware implementation of FIG. 12. FIGS. 6A, 6B, 6C, and 7 illustrate various aspects of the steps in connection with flowchart 1100. For example, referring to FIG. 7, the network entity (base station 704) may, at 706, transmit a first TDD UL DL slot format configuration in RRC signaling. Referring to FIG. 6A, the first TDD UL DL slot format configuration may indicate directions of communication for a set of symbols or a set of slots (e.g., downlink direction "D" for symbols/slots 602, 604).

At 1104, the network entity may transmit an indication of an adjusted type for at least one symbol in the set of symbols or at least one slot in the set of slots. The at least one symbol for which a type of the communication is adjusted may be a D symbol or a U symbol based on the first time TDD UL DL slot format configuration. The at least one slot for which a type of the communication is adjusted may be a D slot or a U slot based on the first time TDD UL DL slot format configuration. For example, referring to FIG. 7, the network entity (base station 704) may transmit, at 708, an indication of an adjusted type for at least one symbol in the set of symbols or at least one slot in the set of slots from the network entity.

In some aspects, the adjusted type may be for SBFD operation of the network entity in the at least one symbol or the at least one slot. For example, referring to FIG. 6C, the adjusted type may be for SBFD operation of the network entity in the at least one symbol or the at least one slot. That is, the symbol/slot type may be changed from a D symbol/slot, as indicated at 642, 644, to a flexible symbol/slot, as indicated by 652, 654 for SBFD operation.

In some aspects, the indication may be included in an RRC message. The RRC message may include at least one of: a second TDD UL DL slot format configuration that is common to multiple UEs or all UEs in a cell or is dedicated for the UE at least for a PCell for an SBFD-aware UE, or an updated TDD UL DL slot format configuration that is common to multiple UEs or all UEs in the cell or is dedicated for the UE at least for a PCell for an SBFD-aware UE. For example, referring to FIG. 7, when the network entity (base station 704), transmits, at 708, the indication of an adjusted type, the indication may be included in an RRC message. The RRC message may include at least one of: a second TDD UL DL slot format configuration (e.g., a new TDD-UL-DL-ConfigurationCommon or TDD-UL-DL-ConfigurationDedicated parameter) that is common to multiple UEs or all UEs in a cell or is dedicated for the UE at least for a PCell for an SBFD-aware UE, or an updated TDD UL DL slot format configuration (an updated TDD-UL-DL-ConfigurationCommon or TDD-UL-DL-Configuration- Dedicated parameter) that is common to multiple UEs or all UEs in the cell or is dedicated for the UE at least for a PCell for an SBFD-aware UE.

In some aspects, the RRC message may be broadcast, multicast, or unicast. The RRC message may further include one or more intended UE IDs or one or more UE group IDs for the intended UEs of the RRC message. For example, referring to FIG. 7, when the network entity (base station 704), transmits, at 708, the indication of an adjusted type that is included in an RRC message, the RRC message may be included in a broadcast, multicast, or unicast, and the RRC message may further include one or more UE IDs or one or more UE group IDs for the intended UEs (e.g., the UE 702) of the RRC message.

In some aspects, the indication may be included in DCI. In some aspects, the DCI may be one of: DCI that has an enhanced DCI format that allows overriding a TDD UL DL slot format configuration in the DCI; DCI that carries an updated TDD UL DL slot format configuration; or DCI that has a DCI format that is UE dedicated or group common. For example, referring to FIG. 7, when the network entity (base station 704), transmits, at 708, the indication of an adjusted type, the indication may be included in DCI, and the DCI may be one of: DCI that has an enhanced DCI format that allows overriding a TDD UL DL slot format configuration (e.g., the TDD-UL-DL-ConfigurationCommon or TDD-UL-DL-ConfigurationDedicated parameter) in the DCI; DCI that carries an updated TDD UL DL slot format configuration (e.g., an updated TDD-UL-DL-ConfigurationCommon or TDD-UL-DL-ConfigurationDedicated parameter); or DCI that has a DCI format that is UE dedicated or group common.

In some aspects, the indication may be included in a MAC-CE. In some aspects, the MAC-CE may be one of: a MAC-CE that has an enhanced MAC-CE format that allows overriding a TDD UL DL slot format configuration in the MAC-CE; a MAC-CE that carries an updated TDD UL DL slot format configuration; or a MAC-CE that has a MAC-CE format that is UE dedicated or group common. For example, referring to FIG. 7, when the network entity (base station 704), transmits, at 708, the indication of an adjusted type, the indication may be included in a MAC-CE, and the MAC-CE may be one of: a MAC-CE that has an enhanced MAC-CE format that allows overriding a TDD UL DL slot format configuration (e.g., the TDD-UL-DL-ConfigurationCommon or TDD-UL-DL-ConfigurationDedicated parameter) in the MAC-CE; a MAC-CE that carries an updated TDD UL DL slot format configuration (e.g., an updated TDD-UL-DL-ConfigurationCommon or TDD-UL-DL-ConfigurationDedicated parameter); or a MAC-CE that has a MAC-CE format that is UE dedicated or group common.

In some aspects, the adjusted type included in the indication may indicate one or more of: a previously indicated downlink symbol changed to the uplink symbol, the previously indicated downlink symbol changed to the flexible symbol, a previously indicated downlink slot changed to the uplink slot, the previously indicated downlink slot changed to the flexible slot, a previously indicated uplink symbol changed to the downlink symbol, the previously indicated uplink symbol changed to the flexible symbol, a previously indicated uplink slot changed to the downlink slot, or the previously indicated uplink slot changed to the flexible slot. For example, referring to FIG. 7, when the network entity (base station 704), transmits, at 708, the indication of an adjusted type, the adjusted type that is included in the indication may indicate one or more of: a previously indicated downlink symbol changed to the uplink symbol, the previously indicated downlink symbol changed to the flexible symbol, a previously indicated downlink slot changed to the uplink slot, the previously indicated downlink slot changed to the flexible slot, a previously indicated uplink symbol changed to the downlink symbol, the previously indicated uplink symbol changed to the flexible symbol, a previously indicated uplink slot changed to the downlink slot, or the previously indicated uplink slot changed to the flexible slot. In one example, referring to FIG. 6A, the adjusted type may indicate a previously indicated downlink symbol/slot, as indicated by 602, 604, changed to an uplink symbol/slot, as indicated by 612, 614. In another example, referring to FIG. 6C, the adjusted type may indicate a previously indicated downlink symbol/slot, as indicated by 642, 644, changed to a flexible symbol/slot, as indicated by 652, 654.

In some aspects, the indication may indicate the adjusted type as an SBFD type of symbol or an SBFD type of slot. For example, referring to FIG. 6C, the indication may indicate the adjusted type as an SBFD type of symbol or an SBFD type of slot, as indicated by 652, 654.

At 1106, the network entity may avoid indicating, in the indication, a change of a downlink symbol or downlink slot in which a common downlink channel or common downlink reference signal is scheduled. The change may include the change to an uplink symbol, an uplink slot, a flexible symbol, a flexible slot, an SBFD type of symbol, or an SBFD type of slot. For example, referring to FIG. 7, the network entity (base station 704) may, at 716, avoid indicating, in the indication, a change of a downlink symbol or downlink slot in which a common downlink channel or common downlink reference signal is scheduled.

In some aspects, the common downlink channel or the common downlink reference signal may include at least one of: an SSB, a CORESET0, a CSS PDCCH, a CSS PDCCH scheduled PDSCH, a reference signal that is common to multiple UEs or all UEs in a cell, or semi-persistent scheduling occasions that are common to the multiple UEs or all UEs in the cell. For example, referring to FIG. 7, when the network entity (base station 704) may, at 716, avoid indicating, in the indication, a change of a downlink symbol or downlink slot in which a common downlink channel or common downlink reference signal is scheduled, the common downlink channel or the common downlink reference signal may include at least one of: an SSB, a CORESET0, a CSS PDCCH, a CSS PDCCH scheduled PDSCH, a reference signal that is common to multiple UEs or all UEs in a cell, or semi-persistent scheduling occasions that are common to the multiple UEs or all UEs in the cell.

At 1108, the network entity may avoid indicating, in the indication, a change of an uplink symbol or an uplink slot to a downlink symbol, a downlink slot, a flexible symbol, a flexible slot, an SBFD type of symbol, or an SBFD type of slot. The network entity may avoid the change based on the uplink symbol or the uplink slot being scheduled with at least one of: a RO, an SRS, or a PUCCH. For example, referring to FIG. 7, the network entity (base station 704) may, at 718, avoid indicating, in the indication, a change of an uplink symbol or an uplink slot to a downlink symbol, a downlink slot, a flexible symbol, a flexible slot, an SBFD type of symbol, or an SBFD type of slot.

Figure 12:
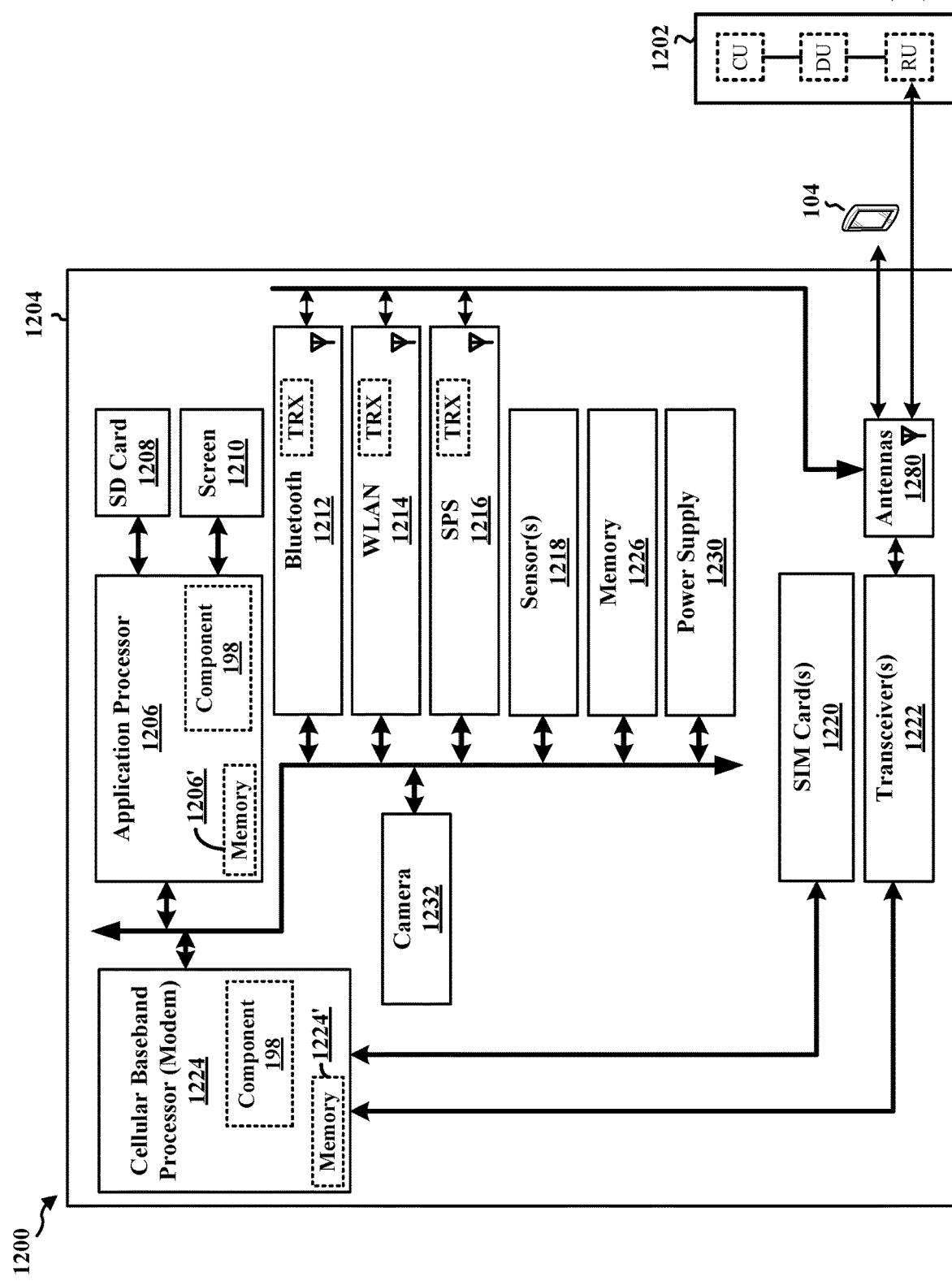
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the component 198 is configured to receive a first TDD UL DL slot format configuration in RRC signaling. The first TDD UL DL slot format configuration may indicate types of communication for a set of symbols or a set of slots. The component 198 may be further configured to receive an indication of an adjusted type for at least one symbol in the set of symbols or at least one slot in the set of slots. The at least one symbol is a D symbol or a U symbol based on the first time TDD UL DL slot format configuration, and the at least one slot may be a D slot or a U slot (U slot) based on the first time TDD UL DL slot format configuration. The component 198 may be further configured to perform any of the aspects described in connection with the flowcharts in FIG. 8 and FIG. 9, and/or performed by the UE 702 in FIG. 7. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving a first TDD UL DL slot format configuration in RRC signaling. The first TDD UL DL slot format configuration may indicate types of communication for a set of symbols or a set of slots. The apparatus 1204 may further include means for receiving an indication of an adjusted type for at least one symbol in the set of symbols or at least one slot in the set of slots. The at least one symbol is a D symbol or a U symbol based on the first time TDD UL DL slot format configuration, and the at least one slot may be a D slot or a U slot (U slot) based on the first time TDD UL DL slot format configuration. The apparatus 1204 may further include means for performing any of the aspects described in connection with the flowcharts in FIG. 8 and FIG. 9, and/or aspects performed by the UE 702 in FIG. 7. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
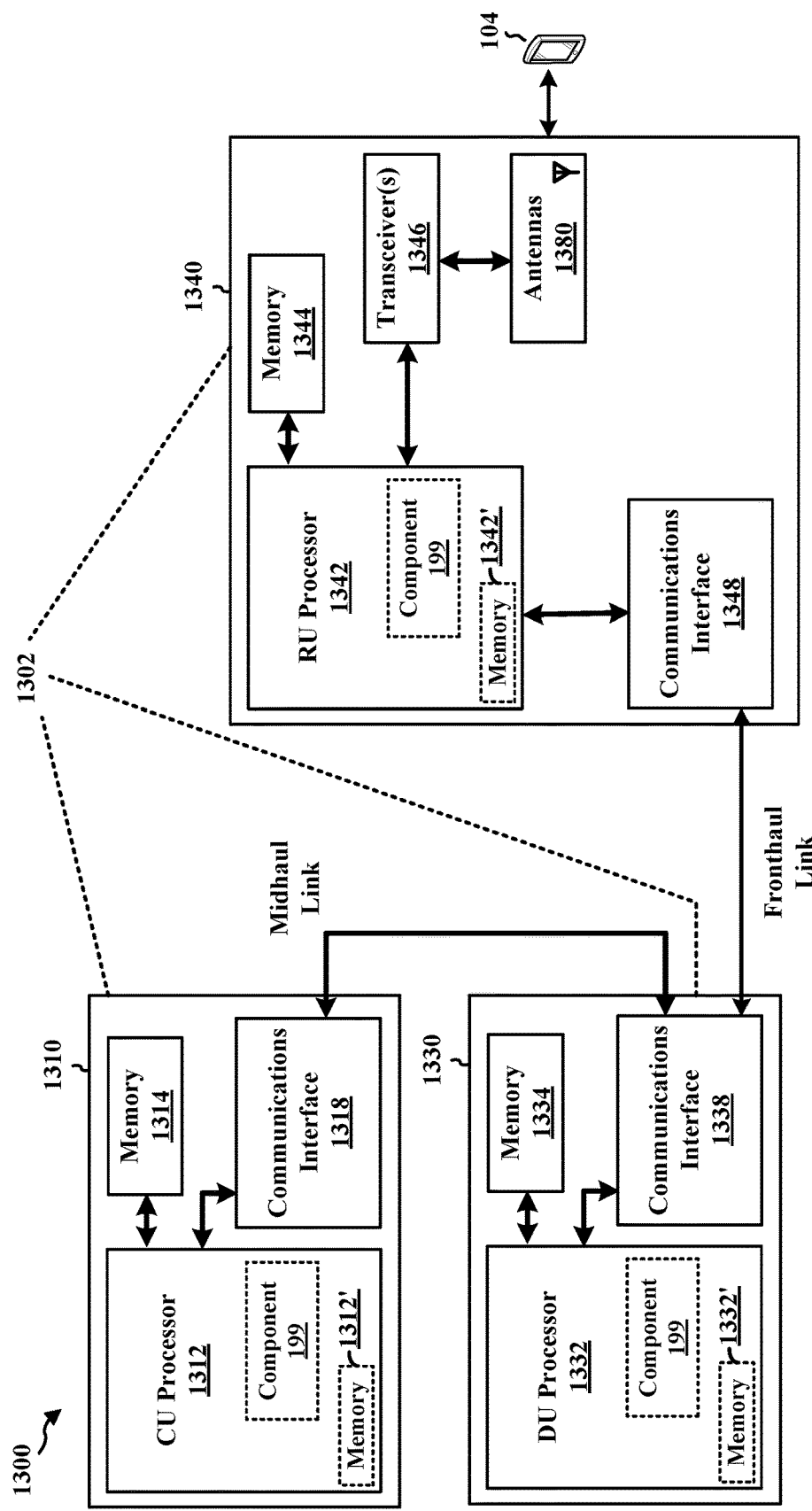
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit a first TDD UL DL slot format configuration in RRC signaling. The first TDD UL DL slot format configuration may indicate types of communication for a set of symbols or a set of slots. The component 199 may be further configured to transmit an indication of an adjusted type for at least one symbol in the set of symbols or at least one slot in the set of slots. The at least one symbol may be a D symbol or a U symbol based on the first time TDD UL DL slot format configuration, and the at least one slot may be a D slot or a U slot based on the first time TDD UL DL slot format configuration. The component 199 may be further configured to perform any of the aspects described in connection with the flowcharts in FIG. 10 and FIG. 11, and/or performed by the base station 704 in FIG. 7. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting a first TDD UL DL slot format configuration in RRC signaling. The first TDD UL DL slot format configuration may indicate types of communication for a set of symbols or a set of slots. The network entity 1302 may further include means for transmitting an indication of an adjusted type for at least one symbol in the set of symbols or at least one slot in the set of slots. The at least one symbol may be a D symbol or a U symbol based on the first time TDD UL DL slot format configuration, and the at least one slot may be a D slot or a U slot based on the first time TDD UL DL slot format configuration. The network entity 1302 may further include means for performing any of the aspects described in connection with the flowcharts in FIG. 10 and FIG. 11, and/or aspects performed by the base station 704 in FIG. 7. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving a first TDD UL DL slot format configuration in RRC signaling. The first TDD UL DL slot format configuration may indicate types of communication for a set of symbols or a set of slots. The method further includes receiving an indication of an adjusted type for at least one symbol in the set of symbols or at least one slot in the set of slots. The at least one symbol may be a D symbol or a U symbol based on the first time TDD UL DL slot format configuration, and the at least one slot may be a D slot or a U slot based on the first time TDD UL DL slot format configuration. The method enables transmission resources to be utilized flexibly in wireless communication according to actual operation requirements. Thus, it improves the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving a first TDD UL DL slot format configuration in RRC signaling, the first TDD UL DL slot format configuration indicating types of communication for a set of symbols or a set of slots the types of the communication including one or more of uplink, downlink, or flexible; and receiving an indication of an adjusted type for at least one symbol in the set of symbols or at least one slot in the set of slots. The at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration.

Aspect 2 is the method of aspect 1, where the adjusted type is for sub-band full-duplex (SBFD) operation of a network entity in the at least one symbol or the at least one slot.

Aspect 3 is the method of any of aspects 1 to 2, where the indication is included in an RRC message including at least one of: a second TDD UL DL slot format configuration that is common to multiple UEs or all UEs in the cell or is dedicated for the UE at least for a primary cell (PCell) for an SBFD-aware UE, or an updated TDD UL DL slot format configuration that is common to multiple UEs or all UEs in the cell or is dedicated for the UE at least for a PCell for an SBFD-aware UE.

Aspect 4 is the method of aspect 3, where the first TDD UL DL slot format is indicated in an RRC message comprised in a broadcast message, a multicast message, or a unicast message.

Aspect 5 is the method of aspect 4, where the RRC message further includes one or more UE IDs or one or more UE group IDs for the intended UEs of the RRC message.

Aspect 6 is the method of aspect 1, wherein the indication is included in DCI.

Aspect 7 is the method of aspect 6, wherein the DCI is one of: DCI that has an enhanced DCI format that allows overriding a TDD UL DL slot format configuration in the DCI; DCI that carries an updated TDD UL DL slot format configuration; or DCI that has a DCI format that is UE dedicated or group common.

Aspect 8 is the method of aspect 1, where the indication is included in a MAC-CE.

Aspect 9 is the method of aspect 8, where the MAC-CE is one of: a MAC-CE that has an enhanced MAC-CE format that allows overriding a TDD UL DL slot format configuration in the MAC-CE; a MAC-CE that carries an updated TDD UL DL slot format configuration; or a MAC-CE that has a MAC-CE format that is UE dedicated or group common.

Aspect 10 is the method of any of aspects 1 to 9, where the adjusted type indicates one or more of: a previously indicated downlink symbol changed to the uplink symbol, the previously indicated downlink symbol changed to the flexible symbol, a previously indicated downlink slot changed to the uplink slot, the previously indicated downlink slot changed to the flexible slot, a previously indicated uplink symbol changed to the downlink symbol, the previously indicated uplink symbol changed to the flexible symbol, a previously indicated uplink slot changed to the downlink slot, or the previously indicated uplink slot changed to the flexible slot.

Aspect 11 is the method of any of aspects 1 to 9, where the indication indicates the adjusted type as an SBFD type of symbol or an SBFD type of slot.

Aspect 12 is the method of any of aspects 1 to 11, where the method further includes identifying an error case in response to the indication indicating a change of a downlink symbol or downlink slot in which a common downlink channel or common downlink reference signal is scheduled. The change includes the change to an uplink symbol, an uplink slot, a flexible symbol, a flexible slot, an SBFD type of symbol, or an SBFD type of slot.

Aspect 13 is the method of aspect 12, where the method further includes skipping the adjusted type in response to the indication indicating the change of the downlink symbol or the downlink slot in which the common downlink channel or the common downlink reference signal is scheduled.

Aspect 14 is the method of aspect 12, where the common downlink channel or the common downlink reference signal includes at least one of: an SSB, a CORESET0, a CSS PDCCH, a CSS PDCCH scheduled PDSCH, a reference signal that is common to multiple UEs or all UEs in a cell, or semi-persistent scheduling occasions that are common to the multiple UEs or all UEs in the cell.

Aspect 15 is the method of any of aspects 1 to 14, where the method further includes identifying an error case in response to the indication indicating a change of an uplink symbol or an uplink slot to a downlink symbol, a downlink slot, a flexible symbol, a flexible slot, a sub-band full-duplex (SBFD) type of symbol, or an SBFD type of slot, based on the uplink symbol or the uplink slot being scheduled with at least one of: a RO, an SRS, or a PUCCH.

Aspect 16 is an apparatus for wireless communication at a UE, including: a memory; and at least one processor coupled to the memory and, based at least in part on information stored in the memory, the at least one processor is configured to perform the method of any of aspects 1-15.

Aspect 17 is the apparatus of aspect 16, further including at least one of a transceiver or an antenna coupled to the at least one processor and configured to receive the first TDD UL DL slot format configuration and the indication of the adjusted type.

Aspect 18 is an apparatus for wireless communication including means for implementing the method of any of aspects 1-15.

Aspect 19 is a computer-readable medium (e.g., a non-transitory computer-readable medium) storing computer-executable code, where the code when executed by a processor causes the processor to implement the method of any of aspects 1-15.

Aspect 20 is a method of wireless communication at a network entity. The method includes transmitting a first TDD UL DL slot format configuration in RRC signaling, the first TDD UL DL slot format configuration indicating types of communication for a set of symbols or a set of slots the types of the communication including one or more of uplink, downlink, or flexible; and transmitting an indication of an adjusted type for at least one symbol in the set of symbols or at least one slot in the set of slots. The at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration.

Aspect 21 is the method of aspect 20, where the adjusted type is for SBFD operation of the network entity in the at least one symbol or the at least one slot.

Aspect 22 is the method of aspect 20, where the indication is included in an RRC message including at least one of: a second TDD UL DL slot format configuration that is common to multiple UEs or all UEs in a cell or is dedicated for the UE at least for a PCell for an SBFD-aware UE, or an updated TDD UL DL slot format configuration that is common to multiple UEs or all UEs in the cell or is dedicated for the UE at least for a PCell for an SBFD-aware UE.

Aspect 23 is the method of aspect 22, where the first TDD UL DL slot format is indicated in an RRC message comprised in a broadcast message, a multicast message, or a unicast message, and the RRC message further includes one or more intended UE IDs or one or more UE group IDs for the intended UEs of the RRC message.

Aspect 24 is the method of aspect 20, where the indication is included in DCI.

Aspect 25 is the method of aspect 24, where the DCI is one of: DCI that has an enhanced DCI format that allows overriding a TDD UL DL slot format configuration in the DCI; DCI that carries an updated TDD UL DL slot format configuration; or DCI that has a DCI format that is UE dedicated or group common.

Aspect 26 is the method of aspect 20, where the indication is included in a MAC-CE.

Aspect 27 is the method of aspect 26, where the MAC-CE is one of: a MAC-CE that has an enhanced MAC-CE format that allows overriding a TDD UL DL slot format configuration in the MAC-CE; a MAC-CE that carries an updated TDD UL DL slot format configuration; or a MAC-CE that has a MAC-CE format that is UE dedicated or group common.

Aspect 28 is the method of any of aspects 20 to 27, wherein the adjusted type indicates one or more of: a previously indicated downlink symbol changed to the uplink symbol, the previously indicated downlink symbol changed to the flexible symbol, a previously indicated downlink slot changed to the uplink slot, the previously indicated downlink slot changed to the flexible slot, a previously indicated uplink symbol changed to the downlink symbol, the previously indicated uplink symbol changed to the flexible symbol, a previously indicated uplink slot changed to the downlink slot, or the previously indicated uplink slot changed to the flexible slot.

Aspect 29 is the method of any of aspects 20 to 27, where the indication indicates the adjusted type as an SBFD type of symbol or an SBFD type of slot.

Aspect 30 is the method of any of aspects 20 to 29, where the method further includes avoiding indicating, in the indication, a change of a downlink symbol or downlink slot in which a common downlink channel or common downlink reference signal is scheduled. The change includes the change to an uplink symbol, an uplink slot, a flexible symbol, a flexible slot, an SBFD type of symbol, or an SBFD type of slot.

Aspect 31 is the method of aspect 30, where the common downlink channel or the common downlink reference signal includes at least one of: an SSB, a CORESET0, a CSS PDCCH, a CSS PDCCH scheduled PDSCH, a reference signal that is common to multiple UEs or all UEs in a cell, or semi-persistent scheduling occasions that are common to the multiple UEs or all UEs in the cell.

Aspect 32 is the method of any of aspects 20 to 29, where the method further includes avoiding indicating, in the indication, a change of an uplink symbol or an uplink slot to a downlink symbol, a downlink slot, a flexible symbol, a flexible slot, a sub-band full-duplex (SBFD) type of symbol, or an SBFD type of slot, based on the uplink symbol or the uplink slot being scheduled with at least one of: a RO, an SRS, or a PUCCH.

Aspect 33 is an apparatus for wireless communication at a network entity, including: a memory; and at least one processor coupled to the memory and, based at least in part on information stored in the memory, the at least one processor is configured to perform the method of any of aspects 20-32.

Aspect 34 is the apparatus of aspect 32, further including at least one of a transceiver or an antenna coupled to the at least one processor and configured to transmit the first TDD UL DL slot format configuration and the indication of the adjusted type.

Aspect 35 is an apparatus for wireless communication including means for implementing the method of any of aspects 20-32.

Aspect 36 is a computer-readable medium (e.g., a non-transitory computer-readable medium) storing computer-executable code, where the code when executed by a processor causes the processor to implement the method of any of aspects 20-32.

What is claimed is:

1. An apparatus for wireless communication at a user equipment (UE), comprising:
   memory; and
   at least one processor coupled to the memory and configured to:
      receive a first time division duplex (TDD) uplink (UL) downlink (DL) slot format configuration in radio resource control (RRC) signaling, the first TDD UL DL slot format configuration indicating types of communication for a set of symbols or a set of slots, the types of the communication including one or more of uplink, downlink, or flexible; and
      receive an indication of an adjusted type for at least one symbol in the set of symbols or at least one slot in the set of slots, wherein the at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration, wherein the indication indicates the adjusted type for a sub-band full-duplex (SBFD) type of symbol or an SBFD type of slot, and the indication indicates a time location of the adjusted type for the at least one symbol or the at least one slot.

2. The apparatus of claim 1, further comprising:
   at least one transceiver coupled to the at least processor and configured to receive the first TDD UL DL slot format configuration and the indication of the adjusted type for the at least one symbol or the at least one slot, wherein the adjusted type is for an SBFD operation of a network entity in the at least one symbol or the at least one slot.

3. The apparatus of claim 1, wherein the indication is comprised in an RRC message comprising at least one of:

a second TDD UL DL slot format configuration that is common to multiple UEs or each UE in a cell or is dedicated for the UE at least for a primary cell (PCell) for an SBFD aware UE, or an updated TDD UL DL slot format configuration that is common to the multiple UEs or each UE in the cell or is dedicated for the UE at least for the PCell for the SBFD aware UE.

4. The apparatus of claim 1, wherein the first TDD UL DL slot format configuration is indicated in an RRC message comprised in a broadcast message, a multicast message, or a unicast message.

5. The apparatus of claim 4, wherein the RRC message further comprises one or more UE IDs or one or more UE group IDs for intended UEs of the RRC message.

6. The apparatus of claim 1, wherein the indication is comprised in downlink control information (DCI).

7. The apparatus of claim 6, wherein the DCI is one of:
DCI format 2_0 that allows overriding a TDD UL DL slot format configuration in the DCI; or
a DCI format that carries an updated TDD UL DL slot format configuration and is dedicated for the UE or group common.

8. The apparatus of claim 1, wherein the indication is comprised in a medium access control-control element (MAC-CE).

9. The apparatus of claim 8, wherein the MAC-CE is one of:
a first MAC-CE format that allows overriding a TDD UL DL slot format configuration in the MAC-CE; or
a second MAC-CE that carries an updated TDD UL DL slot format configuration and is UE dedicated or group common.

10. The apparatus of claim 1, wherein the adjusted type indicates one or more of:
a previously indicated downlink symbol changed to the uplink symbol,
the previously indicated downlink symbol changed to a flexible symbol,
a previously indicated downlink slot changed to the uplink slot,
the previously indicated downlink slot changed to a flexible slot,
a previously indicated uplink symbol changed to the downlink symbol,
the previously indicated uplink symbol changed to the flexible symbol,
a previously indicated uplink slot changed to the downlink slot, or
the previously indicated uplink slot changed to the flexible slot.

11. The apparatus of claim 1, wherein the at least one processor is further configured to:
identify an error case in response to the indication indicating a change of the downlink symbol or the downlink slot in which a common downlink channel or common downlink reference signal is scheduled,
wherein the change comprises the change to the uplink symbol, the uplink slot, a flexible symbol, a flexible slot, the SBFD type of symbol, or the SBFD type of slot.

12. The apparatus of claim 11, wherein the at least one processor is further configured to:
skip the adjusted type in response to the indication indicating the change of the downlink symbol or the downlink slot in which the common downlink channel or the common downlink reference signal is scheduled.

13. The apparatus of claim 11, wherein the common downlink channel or the common downlink reference signal includes at least one of:
a synchronization signal block (SSB),
a control resource set 0 (CORESET0),
a common search space (CSS) physical downlink control channel (PDCCH),
a CSS PDCCH scheduled physical downlink shared channel (PDSCH),
a reference signal that is common to multiple UEs or all UEs in a cell, or
semi-persistent scheduling occasions that are common to the multiple UEs or all UEs in the cell.

14. The apparatus of claim 1, wherein the at least one processor is further configured to:
identify an error case in response to the indication indicating a change of the uplink symbol or the uplink slot to the downlink symbol, the downlink slot, a flexible symbol, a flexible slot, the SBFD type of symbol, or the SBFD type of slot, based on the uplink symbol or the uplink slot being scheduled with at least one of:
a random-access occasion (RO),
a sounding reference signal (SRS), or
a physical uplink control channel (PUCCH).

15. An apparatus for wireless communication at a network entity, comprising:
memory; and
at least one processor coupled to the memory and configured to:
transmit a first time division duplex (TDD) uplink (UL) downlink (DL) slot format configuration in radio resource control (RRC) signaling, the first TDD UL DL slot format configuration indicating types of communication for a set of symbols or a set of slots, the types of the communication including one or more of uplink, downlink, or flexible; and
transmit an indication of an adjusted type for at least one symbol in the set of symbols or at least one slot in the set of slots, wherein the at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration, wherein the indication indicates the adjusted type for a sub-band full-duplex (SBFD) type of symbol or an SBFD type of slot, and the indication indicates a time location of the adjusted type for the at least one symbol or the at least one slot.

16. The apparatus of claim 15, further comprising:
at least one transceiver coupled to the at least one processor and configured to transmit the first TDD UL DL slot format configuration and the indication of the adjusted type for the at least one symbol or the at least one slot,
wherein the adjusted type is for an SBFD operation of the network entity in the at least one symbol or the at least one slot.

17. The apparatus of claim 15, wherein the indication is comprised in an RRC message comprising at least one of:
a second TDD UL DL slot format configuration that is common to multiple UEs or all UEs in a cell or is dedicated for a user equipment (UE) at least for a primary cell (PCell) for an SBFD aware UE, or an updated TDD UL DL slot format configuration that is common to the multiple UEs or all UEs in the cell or is dedicated for the UE at least for the PCell for the SBFD aware UE.

18. The apparatus of claim 15, wherein the first TDD UL DL slot format configuration is indicated in an RRC message that comprised in a broadcast message, a multicast message, or a unicast message, and wherein the RRC message further comprises one or more intended UE IDs or one or more UE group IDs for intended UEs of the RRC message.

19. The apparatus of claim 15, wherein the indication is comprised in downlink control information (DCI).

20. The apparatus of claim 19, wherein the DCI is one of:
DCI format 2_0 that allows overriding a TDD UL DL slot format configuration in the DCI; or
a DCI format that carries an updated TDD UL DL slot format configuration and is UE dedicated or group common.

21. The apparatus of claim 15, wherein the indication is comprised in a medium access control-control element (MAC-CE).

22. The apparatus of claim 21, wherein the MAC-CE is one of:
a first MAC-CE format that allows overriding a TDD UL DL slot format configuration in the MAC-CE; or
a second MAC-CE that carries an updated TDD UL DL slot format configuration and is UE dedicated or group common.

23. The apparatus of claim 15, wherein the adjusted type indicates one or more of:
a previously indicated downlink symbol changed to the uplink symbol,
the previously indicated downlink symbol changed to a flexible symbol,
a previously indicated downlink slot changed to the uplink slot,
the previously indicated downlink slot changed to a flexible slot,
a previously indicated uplink symbol changed to the downlink symbol,
the previously indicated uplink symbol changed to the flexible symbol,
a previously indicated uplink slot changed to the downlink slot, or
the previously indicated uplink slot changed to the flexible slot.

24. The apparatus of claim 15, wherein the at least one processor is further configured to:
avoid indicating, in the indication, a change of the downlink symbol or the downlink slot in which a common downlink channel or common downlink reference signal is scheduled,
wherein the change comprises the change to the uplink symbol, the uplink slot, a flexible symbol, a flexible slot, the SBFD a sub-band full duplex (SBFD) type of symbol, or the SBFD type of slot.

25. The apparatus of claim 24, wherein the common downlink channel or the common downlink reference signal includes at least one of:
a synchronization signal block (SSB),
a control resource set 0 (CORESET0),
a common search space (CSS) physical downlink control channel (PDCCH),
a CSS PDCCH scheduled physical downlink shared channel (PDSCH),
a reference signal that is common to multiple UEs or all UEs in a cell, or
semi-persistent scheduling occasions that are common to the multiple UEs or all UEs in the cell.

26. The apparatus of claim 15, wherein the at least one processor is further configured to:
avoid indicating, in the indication, a change of the uplink symbol or the uplink slot to the downlink symbol, the downlink slot, a flexible symbol, a flexible slot, the SBFD type of symbol, or the SBFD type of slot, based on the uplink symbol or the uplink slot being scheduled with at least one of:
a random-access occasion (RO),
a sounding reference signal (SRS), or
a physical uplink control channel (PUCCH).

27. A method of wireless communication at a user equipment (UE), comprising:
receiving a first time division duplex (TDD) uplink (UL) downlink (DL) slot format configuration in radio resource control (RRC) signaling, the first TDD UL DL slot format configuration indicating types of communication for a set of symbols or a set of slots, the types of the communication including one or more of uplink, downlink, or flexible; and
receiving an indication of an adjusted type for at least one symbol in the set of symbols or at least one slot in the set of slots, wherein the at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration, wherein the indication indicates the adjusted type as a sub-band full-duplex (SBFD) type of symbol or an SBFD type of slot, and the indication indicates a time location of the adjusted type for the at least one symbol or the at least one slot.

28. A method of wireless communication at a network entity, comprising:
transmitting a first time division duplex (TDD) uplink (UL) downlink (DL) slot format configuration in radio resource control (RRC) signaling, the first TDD UL DL slot format configuration indicating types of communication for a set of symbols or a set of slots, the types of the communication including one or more of uplink, downlink, or flexible; and
transmitting an indication of an adjusted type for at least one symbol in the set of symbols or at least one slot in the set of slots, wherein the at least one symbol for which a type of the communication is adjusted is a downlink symbol (D symbol) or an uplink symbol (U symbol) based on the first time TDD UL DL slot format configuration, or the at least one slot for which the type of the communication is adjusted is a downlink slot (D slot) or an uplink slot (U slot) based on the first time TDD UL DL slot format configuration, wherein the indication indicates the adjusted type for a sub-band full-duplex (SBFD) type of symbol or an SBFD type of slot, and the indication indicates a time location of the adjusted type for the at least one symbol or the at least one slot.

* * * * *